United States Patent [19]

Nardelli et al.

[11] Patent Number: 5,248,804

[45] Date of Patent: Sep. 28, 1993

[54] SEPARATION OF PHYTATE FROM PLANT PROTEIN USING ION EXCHANGE

[75] Inventors: Christy A. Nardelli, Westerville; Terrence B. Mazer, Reynoldsburg; Arthur J. C. L. Hogarth, Columbus; John D. Suh, Gahanna; Andre Daab-Krzykowski, Columbus, all of Ohio; Leona M. Pickett, Caledonia, Ill.; Harold W. Keller; William J. Nelson, both of Rockford, Ill.

[73] Assignee: Abbott Laboratories, Abbott Park, Ill.

[21] Appl. No.: 986,651

[22] Filed: Dec. 8, 1992

[51] Int. Cl.$^5$ ............................ A23J 1/14; C07F 9/117
[52] U.S. Cl. ...................................................... 558/147
[58] Field of Search ......................................... 558/147

[56]   References Cited
   U.S. PATENT DOCUMENTS

| | | | |
|---|---|---|---|
| 2,732,395 | 1/1956 | Bolley et al. | 558/144 |
| 3,728,327 | 4/1973 | Frazer et al. | 530/378 |
| 3,733,207 | 5/1973 | McCabe | 426/46 |
| 3,736,147 | 5/1973 | Iacobucci et al. | 530/377 |
| 4,072,670 | 2/1978 | Goodnight, Jr. et al. | 530/378 |
| 4,088,795 | 5/1978 | Goodnight, Jr. et al. | 426/598 |
| 4,091,120 | 5/1978 | Goodnight, Jr. et al. | 426/598 |
| 4,212,799 | 7/1980 | Nuzzolo et al. | 530/377 |
| 4,375,431 | 3/1983 | Bradford et al. | 530/378 |
| 4,697,004 | 9/1987 | Puski et al. | 530/378 |

FOREIGN PATENT DOCUMENTS 9008476 8/1990 PCT Int'l Appl. .
1574110 9/1980 United Kingdom .

OTHER PUBLICATIONS

"Studies on the Preparation of Soy Bean Protein Free From Phosphorous", McKinney et al, Journal of Biological Chemistry, 178:117-132 (1949).
"Phytate-Protein Interactions in Soybean Extracts and Low-Phytate Soy Protein Products", deRham et al, Journal of Food Science, 44:596-600 (1979).
"Phytate Removal from Soy Protein Isolates Using Ion Exchange Processing Treatments", Brooks et al, Journal of Food Science, 47:1280-1282 (1982).
"Ultrafiltration Studies of Foods: Part 1—The Removal of Undesirable Components in Soymilk and the Effects on the Spray-dried Powder", Ang et al, Food Chemistry, 20:183-189 (1986).
"Effect of Local Food Processing on Phytate Levels in Cassava, Cocoyam, Yam, Maize, Sorghum, Rice, Cowpea, and Soybean", Marfo et al, Journal of Agriculture and Food Chemistry, 38:1580-1585 (1990).
"Association of Zinc with Soy Proteins as Affected by Heat and pH", Khan et al, Journal of Food Science, 55:263-266 (1990).
U.S. patent appln. Ser. No. 07/811,102, filed Dec. 20, 1991, by Mazer et al, for "Separation of Phytate And Manganese From Plant Protein and Dietary Fiber Using Alumina".

Primary Examiner—Mary C. Lee
Assistant Examiner—Michael G. Ambrose
Attorney, Agent, or Firm—Lonnie R. Drayer; Donald O. Nickey

[57]   ABSTRACT

A novel process for the removal of phytate from protein using ion exchange has been developed. The process involves the upflow passage of a protein slurry at an elevated temperature through a strong base anion exchanger in the chloride form. The weak base anion sites inherent to the resin have been converted to the free base form. The anion exchange material can easily be regenerated. The process can be used on-line, yields phytate removal of greater than 90%, has high (greater than 90%) protein recovery, is cost-effective, and is environmentally friendly.

31 Claims, 21 Drawing Sheets

SEPARATION OF PHYTATE FROM PLANT PROTEIN USING ION EXCHANGE

FIELD OF THE INVENTION

The present invention relates generally to a method of separating phytate from plant protein and more particularly to a method of using ion exchange to separate phytate from plant protein.

BACKGROUND OF THE INVENTION

Phytic acid, also known as inositol hexaphosphate, is a myo-inositol molecule in which all the hydroxy groups have been replaced by phosphate groups as shown in FIG. 1. Phytic acid is the source of up to 85% of the total phosphorus in many cereals and legumes. Phytate comprises the salts of phytic acid. Phytic acid is believed to reduce the bioavailability of essential minerals by forming complexes with them. Also, it may influence the functional and nutritional value of proteins.

In initial experimentation regarding the determination of effects of ion exchangers on various forms of proteins, it was confirmed that phytate could be removed by various exchangers. Although removal of phytate from protein using ion exchangers is well documented in the literature, a successful commercial application using ion exchange technology to remove phytate from protein had not been developed. Common problems encountered with ion exchange processes have included poor protein recovery (i.e. protein adhered to the ion exchange surface) and inability of the protein slurry to pass through a column containing resins (resulting in high pressure drop and a plugged column). "A plugged column" is a column in which precipitated protein has gelatinized in and around the ion exchange media, obstructing or preventing flow. The ion exchange process which is disclosed herein has overcome these obstacles and exhibits excellent flow characteristics, good protein recoveries, and good phytate removal.

PRIOR ART

In a typical commercial process, soy proteins are extracted at slightly alkaline pH from defatted soy flake or defatted soy flour. The major protein fraction is then precipitated from the clarified extract by adjusting the pH to the isoelectric point of the proteins (pH 3.8 to 6.0). Inasmuch as the proteins are insoluble at this pH the protein curd can be separated from soluble sugars, salts, etc., by centrifugation. To complete the purification, the protein curd is washed with water at least once at this isoelectric pH, then the protein is spray-dried either as is or after resuspension at neutral pH. Under such prior art conditions, a major portion of the phytate present in the soy flour will complex with the protein and will be present in the soy isolate. Commercial soy protein isolates typically have a phytate content of 2.0-2.5% and in some instances as much as 3% by weight.

The prior art contains many examples of methods of separating phytic acid, and phytates, from protein. The desirability of an economical method of separating phytates from the more nutritional components of a food, such as maize, rice, sorghum, cowpea, soybean, cassava, cocoyam and yam is well established, see for example "Effect of Local Food Processing on Phytate Levels in Cassava, Cocoyam, Yam, Maize, Sorghum, Rice, Cowpea, and Soybean", Marfo et al., *Journal of Agriculture and Food Chemistry*, 38:1580-1585 (1990).

Bolley et al., U.S. Pat. No. 2,732,395, teaches a method for separating phytic acid from various oil seeds with an aqueous acid extraction at a pH near the isoelectric point of the protein (about 4.5). The phytic acid is partly dissolved at this pH and is recovered. The protein is recovered by solubilizing it at an alkaline pH, separating the insoluble portion, and precipitating the protein at a pH near the isoelectric point. The resulting protein fraction contained as much as 4% organic phosphorus, which is an indicator of a high phytate content.

"Studies on the Preparation of Soy Bean Protein Free from Phosphorus", McKinney et al., *Journal of Biological Chemistry* 178: 117-132 (1949), teaches that phytic acid dissociates from soy protein at pH values between 11.0 and 11.5 and forms a precipitate that may be removed by centrifugation.

Goodnight et al., U.S. Pat. No. 4,072,670, teaches that an alkali-stable complex is formed between protein and phytic acid in the acidic conditions used by Bolley et al In an attempt to overcome this disadvantage, Goodnight et al. teaches precipitation of the phytate at pH values a little higher than those described by McKinney et al., i.e., pH values between 11.6 and 14. Phytate is then separated from the protein prior to protein precipitation at the protein isoelectric point of pH 4.5. One disadvantage of the Goodnight et al. process is that exposing proteins to such an extremely alkaline pH adversely affects the nutritive value of the protein. Also, there is a tendency to increase the undesirable formation of lysinoalanine. In addition, continuous centrifuges employed in industrial applications are unable to separate the very light phytate precipitate formed at such a high pH.

Goodnight et al., U.S. Pat. No. 4,088,795 teaches the removal of phytate by rendering the phytate insoluble at pH 10. This high of a pH is detrimental to protein. The insoluble protein is separated by centrifugation, then ultrafiltration. However, in the ultrafiltration step the protein is in the retentate. Goodnight et al., U.S. Pat. No. 3,995,795 teaches basically the same method as U.S. Pat. No. 4,088,795 with additional heat treating steps, as well as a recipe for soy milk containing a protein isolate.

Goodnight et al., U.S. Pat. No. 4,091,120 teaches the ultrafiltration of a material containing soy protein which has already been extracted and centrifuged. During ultrafiltration the protein is collected in the retentate while carbohydrates and minerals are passed into the permeate. In this patent Goodnight et al., also teach formulations for nutritional products containing soy protein isolated by the process taught therein.

deRham, UK Patent 1,574,110, teaches methods by which the phytic acid content of a soy protein isolate can be decreased to be in the range of 2% to 0.6%, when protein precipitation from neutral soy extract (extracted at pH 8.0) is performed at pH 5.7 instead of pH 4.5. When soy proteins are extracted at pH 2.5 and recovered at pH 4.5 the phytic acid content is reported to be 1.7%. By performing the precipitation at pH 5.5, the phytic acid content was reportedly decreased to 0.7%. The phytic acid concentration of the isolate could be decreased to 0.2% by extracting the protein at pH 11.5 and recovering it at pH 5.5. However, these methods suffer from various drawbacks, i.e. protein yield is decreased by as much as 20%, which renders them commercially impracticable.

"Phytate-Protein Interactions in Soybean Extracts and Low-Phytate Soy Protein Products", deRham et al, *Journal of Food Science* 44:596-600 (1979), teaches that calcium ions enhance the precipitation of soy protein at pH 11.5. Very low phytic acid concentrations could be achieved by extraction with 10% NaCl, but these methods produced a protein isolate which is effectively unusable without desalting by dialysis or ultrafiltration. Moreover, the protein yield according to these methods is low.

"Association of Zinc with Soy Proteins as Affected by Heat and pH", Khan et al., *Journal of Food Science* 55:263-266 (1990), at page 264 points out that one shortcoming of Goodnight et al. and deRham et al. is that unless most of the phytate is removed by centrifugation at pH 12.0 prior to acid precipitating the protein, isolated soy protein should be supplemented with zinc when it is the main source of zinc in the diet.

Puski et al., U.S. Pat. No. 4,697,004, teaches a soy protein preparation method in which proteins are extracted at a pH of 8 to 10 and at a temperature above 65° C. The protein product contains less than about 0.3% phytic acid. Again, however, such high temperatures adversely affect the solubility and other functional properties of the proteins.

"Phytate Removal from Soy Protein Isolates Using Ion Exchange Processing Treatments", Brooks et al., *Journal of Food Science* 47:1280-1282 (1982), teaches a method for phytate removal from soy protein isolates using ion exchange treatments. A combination of cation and anion exchange processes is required for effective phytate removal. A dialysis step is used to remove other nonprotein components. This method, however, would be unacceptably complex and expensive for use on a commercial scale.

Enzymes, such as phytase, also have been used in the preparation of soy protein isolates. For example, McCabe, U.S. Pat. No. 3,733,207, teaches the preparation of a soluble protein fraction having a decreased phytic acid content. Proteins are solubilized in alkaline conditions, and wheat phytase is added after lowering the pH to about 5. The protein fraction not precipitated at pH 4.5 is recovered. The resulting protein, because of its solubility in acidic conditions, is suitable for carbonated beverages. The enzyme treatment is long, however, requiring 24-36 hours. The phytic acid content of the protein is not reported in the patent.

Published PCT Application WO 90/08476 teaches a method of producing a phytate free, or low phytate, soy protein isolate using the enzyme phytase.

Iacobucci et al , U.S. Pat. No. 3,736,147, teaches a method of reducing phytate concentration in soy protein involving various chemical treatments in combination with ultrafiltration. The chemical treatments include hydrolysis of phytic acid by indigenous phytase at neutral pH, ultrafiltration in the presence of calcium ions at low pH, or the use of Ethylenediamine Tetraacetic Acid (EDTA) at high pH. The methods taught by Iacobucci et al. have several disadvantages. Soy globulins are known to dissociate into subunits and to be denatured at such low pH values. The use of calcium ions at low pH values requires an additional ultrafiltration step for salt removal. The high temperature (65° C.) in the phytase method may decrease the solubility of the protein on either side of the isoelectric point. The lowest phosphorous content achieved is not less than 0.2%, which corresponds to 0.7% phytic acid. The methods employ very time-consuming 18-48 hour ultrafiltrations.

Several publications, for example U.S. Pat. No. 3,728,327, contain descriptions of attempts to separate phytates from protein using ultrafiltration, but repeatedly the protein was captured in the retentate, so that either no separation was achieved or only a minor amount of separation was achieved. These separation processes were attempted not only with soybeans and soy milk, but also peanuts, cottonseed, and other vegetable sources of protein. "Ultrafiltration Studies of Foods: Part 1—The Removal of Undesirable Components in Soymilk and the Effects on the Quality of the Spray-dried Powder", Ang et al., *Food Chemistry*, 20:183-189 (1986).

U.S. Pat. Nos. 4,212,799 and 4,375,431 teach the use of various forms of aluminum to bind or separate materials in protein containing substances. In each instance the aluminum is left as an ingredient of the resultant material. It is believed that intentionally adding bound or unbound aluminum to a food substance is highly undesirable because there is some evidence that the aluminum could cause health problems.

The prior art illustrates that considerable effort has been expended to develop methods to reduce the phytic acid content of soy protein. These methods, however, have suffered from various drawbacks, including inefficient phytic acid reduction, high cost, long treatment time requirements, unacceptable alterations of the treated protein, addition of aluminum to foodstuff, and incompatibility with commercial soy protein processing techniques and equipment. As a result, there continues to be a need for an improved method of producing phytate-free or low phytate plant protein which avoid these drawbacks.

The present invention comprises a novel and unobvious method through which low-phytate isolates and concentrates of plant protein may be prepared. The invention further comprises low-phytate soy protein isolates produced according to the methods and processes of the present invention.

BRIEF DESCRIPTION OF THE DRAWINGS

The features of the present invention which are believed to be novel are set forth with particularity in the appended claims. The present invention, both as to its structure and manner of operation, may best be understood by reference to the following detailed description, taken in accordance with the accompanying drawings in which:

EXPERIMENT I

Figure 1:
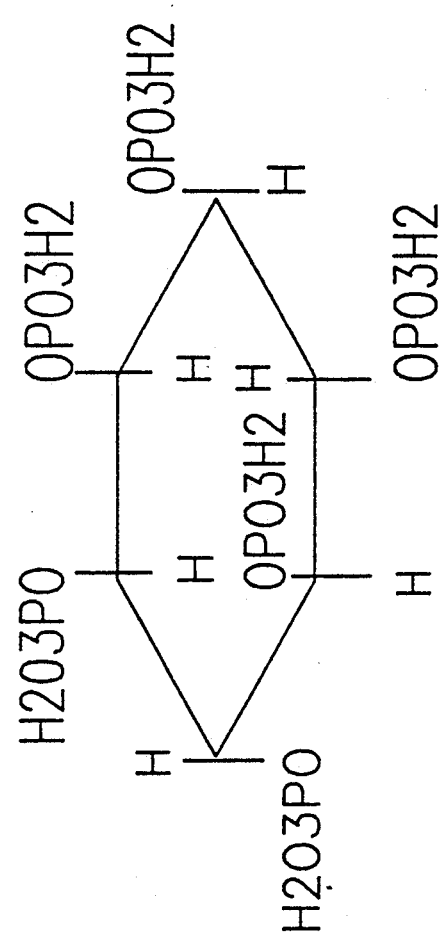
FIG. 1 is a representation of the chemical structure of phytate.

Initial experiments were designed in a batch mode to evaluate the effect of different resins on soy proteins. As used herein and in the claims "batch mode" is understood to mean that the resin(s) and protein source are placed into a vessel together, and both remain in the vessel throughout the process. The first batch tests were performed using a strong acid cation exchange resin obtained from Rohm & Haas, Independence Mall West, Philadelphia, Pa. 19105 U.S.A., distributed under the trade designation "C-280, H+ form", and a weak acid cation exchange resin obtained from Rohm & Haas, distributed under the trade designation "IRC-50, H+ form". After three hours contact time, one half of each filtrate was placed in contact with a weak base anion exchange resin obtained from Rohm & Haas, distributed under the trade designation "A-392S, free base form", and a strong anion exchange resin obtained from Rohm & Haas, distributed under the trade designation "IRA-910, OH-form". Samples were submitted for protein and phytate analyses. Protein determinations were made on a Tecator Kjeltec system for determination of protein nitrogen. Chloride was determined using a Metrohm potentiometric titration.

The soy protein used in evaluating the present invention was SUPRO® 1610 (formerly called PP 1610) which is a commercially available soy protein isolate manufactured by Protein Technology International which is a division of Ralston Purina, 835 South 8th Street, St. Louis, Mo. 63012. It is believed that SUPRO® 1610 is typical of commercially available soy protein isolates which are made by adjusting the pH of a soy flour slurry to about 9 in order to solubilize the protein; then centrifuging the slurry to separate a sludge of fiber and insoluble materials from a centrate containing the soluble protein; then adjusting the pH of the centrate to about 4.5 to precipitate the protein; and then again centrifuging to get a sludge containing the protein. It is believed that SUPRO® 1610 has had the pH adjusted to 7.0 to neutralize it.

The term "protein isolate having a low phytate content" as employed herein and in the claims is understood to mean a protein product containing 88% or more by weight of protein and less than 1.0% by weight of phytate as determined by the analytical method set forth below.

With respect to the invention disclosed and claimed herein the procedure utilized for the determination of phytate content in a protein isolate involves the extraction of phytate with hydrochloric or trichloracetic acid, separation on a mixed-mode column using a sodium hydroxide gradient, and subsequent detection via suppressed conductivity. The procedure comprises the following steps.

1. A protein isolate sample is weighed and extracted in 2.4% hydrochloric acid in a shaker bath for two hours. It is understood that sample weight is dependent upon the estimated concentration of phytate, i.e. the higher the estimated level of phytate the smaller the sample size should be.

2. The pH of the sample is adjusted to be greater than 8, followed by quantitative transfer and dilution to a specified volume. It is believed that persons of ordinary skill in the science of analytical chemistry will understand that the exact amount of dilution is dependent upon the estimated concentration of phytate in the sample.

3. The diluted sample is filtered through #2V Whatman filter paper and the filtrate is collected in a suitable container.

4. An aliquot of the filtrate is injected onto an OmniPac ™ mixed mode column, available from Dionex Corporation, Sunnyvale, Calif., U.S.A. and separation is achieved utilizing a 200 mM sodium hydroxide gradient in the range of 28% to 75% in the presence of 5% isopropyl alcohol at a flow rate of 1.0 ml per minute.

5. Detection of phytate in the sample is made via suppressed conductivity utilizing a Dionex AMMS anion micromembrane suppressor. The micromembrane suppressor exchanges increasing sodium ions in the mobile phase with hydrogen cations from the regenerant (0.15% sulfuric acid), thereby suppressing the increasing background signal present due to the increasing sodium hydroxide concentration in the gradient. The detector then measures conductivity due to the structurally attached phosphate portion of the phytate structure.

6. The concentration of phytate in the sample is determined by comparison of chromatographic data of the sample with standards of known concentrations of phytate. For example, this analytical procedure has been successfully practiced using a Spectra Physics Model 4270 Integrator, but it is understood that any suitable equipment such as another integrating system or a chart recorder may be employed in this procedure.

It is believed that a person of ordinary skill in the science of analytical chemistry will find it obvious to adjust sample sizes, dilutions, and so forth of materials which are to be compared, (including known concentrations), in order that the results may be plotted in an easily comparable range of values.

Table I shows the results from initial batch screening for phytate removal. As used herein, with respect to Table I and the results of all of the following experiments, "Relative Phytate Reduction" is understood to mean a comparison of phytate content by weight of a vegetable protein before and after being subjected to a phytate removal process. Monjonnier techniques were used for determining total solids. These results were all encouraging, with evidence of significant phytate removal and very little total solids loss. However, with this experimental design, effects of individual resin types were unknown. Therefore, the next experiment was designed to determine the effects of each individual resin type.

TABLE 1

TOTAL SOLIDS AND PHYTATE DATA-ION EXCHANGE BATCH SCREENING

| SAMPLE | RELATIVE PHYTATE REDUCTION | TOTAL SOLIDS |
|---|---|---|
| WACER/WBAER | >90% | 4.06% |
| WACER/SBAER | >90% | 4.01% |
| SACER/WBAER | >70% | 4.19% |
| SACER/SBAER | >90% | 3.63% |

KEY:
WACER = weak acid cation exchange resin
SACER = strong acid cation exchange resin
WBAER = weak base anion exchange resin
SBAER = strong base anion exchange resin As the results of the screening experiment were encouraging, it was decided to further investigate resin interactions with soy protein. Two 900 ml aliquots of 5% SUPRO® 1610 soy protein were slurried and allowed to react approximately seventeen hours with a weak acid cation exchange resin obtained from Rohm & Haas, distributed under the trade designation "IRC-50, H+ form" or a strong acid cation exchange resin obtained from Rohm & Haas, distributed under the trade designation "C-280, H+ form". Slurries were then screened through 60 mesh stainless steel screen to remove the resins, and 230 ml aliquots of each were treated with a weak base anion exchange resin obtained from Rohm & Haas, distributed under the trade designation "A-392S, free base form", a strong base anion exchange resin obtained from Rohm & Haas, distributed under the trade designation "IRA-910, OH-form", or alumina (obtained from Alcoa, Inc. Vidalia, La. 71373, U.S.A.) distributed under the trade designation "C101-2". Each slurry was then screened once again to remove the resin or alumina, and each sample type including an untreated "Feed" sample (nine different types) was evaluated for phytate, protein, amino acid, and mineral content.

Phytate, protein, and mineral results for the second group of batch method screenings using different resin forms are shown in Table 2 (all mineral values are in ppm). Mineral analyses were performed using Inductively Coupled Argon Plasma Spectrometry or Atomic Absorption Spectrophotometic Techniques. Phytate reduction was evident in all cases, but the greatest reductions were evident in weak acid cation exchange resin (WACER) experiments. The least effect on phytate removal was seen in the sample treated with strong acid cation exchange resin (SACER). The experiment using weak acid cation exchange resin indicated that phytate was being removed because of the ion exchange of the positively charged portion of the molecule, most likely calcium or magnesium. This was contrary to predicted results, as it was expected that the phosphate group (anionic) would be the targeted exchange portion. Protein reduction was evident in all cases. However, the weak acid/weak base treated soy showed the least reduction in protein content. Mineral reductions were noted with strong acid cation resin associated samples. Beckman Amino Acid Analyzers were used for determination of amino acid profiles. Amino acid results are given in Table 3. Amino acid profiles remained unaffected, except for those samples treated with alumina. In both alumina-treated samples, reductions in aspartic acid and serine were evident, and an increase in threonine content resulted.

TABLE 2

PHYTATE, PROTEIN, AND MINERAL LEVELS FOR SOY PROTEINS TREATED WITH VARIOUS ION EXCHANGERS IN A BATCH MODE
(All Mineral data in ppm)

| SAMPLE | PROTEIN | RELATIVE PHYTATE REDUCTION | Ca | Na | K | Mg | P |
|---|---|---|---|---|---|---|---|
| Untreated | 3.92% | — | 63.8 | 518 | 30.6 | 14.7 | 456 |
| WACER | 4.01% | >90% | 61.3 | 487 | 28.4 | 14.1 | 144 |
| SACER | 3.19% | >35% | 2.6 | 9.7 | N/D | 0.4 | 369 |
| WACER/WBAER | 3.50% | >95% | 52.5 | 446 | 25.9 | 13.3 | 117 |
| WACER/SBAER | 2.93% | >95% | 47.8 | 39.6 | 22.7 | 11.0 | 70.2 |
| WACER/Alumina | 2.93% | >95% | 45.7 | 1706 | 1213 | 11 | 76.8 |
| SACER/WBAER | 2.22% | >80% | 2.6 | 4.1 | N/D | 0.7 | 109 |
| SACER/SBAER | 1.96% | >90% | 2.7 | 6.7 | N/D | 0.7 | 86.6 |
| SACER/Alumina | 2.32% | >95% | 8.9 | 647 | 620 | 1.5 | 166 |

KEY:
WACER = weak acid cation exchange resin
SACER = strong acid cation exchange resin
WBAER = weak base anion exchange resin
SBAER = strong base anion exchange resin

TABLE 3

AMINO ACID PROFILES OF PROTEINS TREATED VARIOUSLY W/ION EXCHANGE RESINS

| Amino Acid | Feed | WA | SA | WA/WB | WA/SB | WA/Alumina | SA/WB | SA/SB | SA/Alumina |
|---|---|---|---|---|---|---|---|---|---|
| Aspartic Acid | 11.51 | 10.13 | 11.94 | 11.23 | 11.50 | 0.171 | 11.21 | 11.28 | 0.129 |
| *Threonine | 3.70 | 3.32 | 3.95 | 3.80 | 3.89 | 10.27 | 3.74 | 3.72 | 10.43 |
| Serine | 5.31 | 4.71 | 5.64 | 5.26 | 5.43 | 3.45 | 5.27 | 5.26 | 3.45 |
| Glutamic Acid | 19.39 | 17.03 | 19.66 | 18.66 | 19.04 | 18.91 | 18.43 | 18.57 | 18.92 |
| Proline | 5.20 | 4.64 | 5.49 | 5.29 | 5.43 | 5.36 | 5.14 | 5.15 | 5.22 |
| Glycine | 4.08 | 3.64 | 4.33 | 4.09 | 4.16 | 4.16 | 4.05 | 4.08 | 4.14 |
| Alanine | 4.06 | 3.69 | 4.42 | 4.14 | 4.30 | 4.20 | 4.14 | 4.18 | 4.27 |
| *Valine | 4.06 | 3.74 | 4.20 | 4.06 | 4.27 | 4.13 | 4.01 | 4.18 | 4.22 |
| *Methionine | 1.07 | 0.873 | 1.03 | 0.971 | 0.956 | 1.09 | 0.856 | 0.918 | 1.08 |
| *Isoleucine | 4.11 | 3.74 | 4.17 | 4.03 | 4.23 | 4.13 | 4.05 | 4.18 | 4.18 |
| *Leucine | 7.70 | 6.98 | 8.25 | 7.80 | 8.16 | 7.92 | 7.79 | 7.86 | 7.97 |
| Tyrosine | 3.85 | 3.52 | 4.20 | 4.00 | 4.13 | 3.99 | 3.96 | 3.98 | 4.01 |
| *Phenylalanine | 5.05 | 4.59 | 5.42 | 5.17 | 5.39 | 5.18 | 5.14 | 5.20 | 5.22 |
| Histidine | 2.45 | 2.19 | 2.60 | 2.49 | 2.56 | 2.49 | 2.48 | 2.45 | 2.46 |
| *Lysine | 6.07 | 5.39 | 6.21 | 6.00 | 5.97 | 6.08 | 5.86 | 5.87 | 5.95 |
| Arginine | 7.50 | 6.68 | 7.81 | 7.46 | 7.68 | 7.41 | 7.39 | 7.40 | 7.50 |

*Essential amino acids
WA = Weak Acid Cation Exchange Resin
SA = Strong Acid Cation Exchange Resin
WB = Weak Base Anion Exchange Resin
SB = Strong Base Anion Exchange Resin

EXPERIMENT II

It was observed that when SUPRO ® 1610 was used for soy protein feed preparation, some insoluble protein invariably remained in the slurry. A new technique was investigated in which the water for the slurry was heated to 71° to 79° C., protein added to the heated water with agitation, and mixed well until the slurry was smooth. The slurry was then cooled, and filtered through a 35 or 50 mesh stainless steel screen to remove undispersed protein clumps. These samples and an unscreened sample were then submitted for protein determinations to determine any screening effect on protein concentration.

Heating the water prior to addition of the SUPRO ® 1610 soy protein resulted in a dramatic improvement in the protein slurry. Very few protein aggregates were present using this technique. Protein hydration appears to improve such that very little fallout is apparent, even after one week. Additionally, screening of the slurry with 50 mesh (300 micron) filters did not appear to remove any appreciable protein. This method of preparing a soy protein feed slurry was used throughout the remainder of the experiments.

EXPERIMENT III

The column used for this experiment and subsequent experiments was a glass water-jacketed column having a height of 122 cm (48 inch) and a diameter of 25.4 mm (1 inch). Both peristaltic and gear pumps were used to control the flow of the feed in a downflow or upflow mode as specified for each experiment. For temperature control, heated water was circulated through the column water jacket. The feed slurry was heated to the desired temperature in a double boiler. To assure homogeneous mixing, the protein feed slurry was stirred throughout the run. The conductivities of the effluents of water rinses were used to determine effective rinsing of the column. A fast-rinsing step was introduced after "sweeten-off" (gradual elution of protein material from the column). A fast rinse was also used after the slow rinses following the caustic and acid steps. These rinses were terminated when the conductivity was less than 2,000 μmhos. The final rinse after conditioning should have a conductivity of less than 50 /μmhos. "Pressure drop" in the column mode experiments is the difference in pressure between the pressure at the inlet to the column and the pressure at the outlet from the column, or in other words the pressure differential across the column. There was some concern that too great a pressure drop indicates a poor flow of the slurry through the column and that resultant back pressure could cause rupture of a glass column.

As the weak acid cation exchanger showed the most promise in the batch experiments, experiments using a column mode proceeded using weak cation exchange resin in the hydrogen form. As used herein and in the claims "column mode" is understood to be a procedure in which the resin(s) are located in a column having both inlet and outlet ports. A protein slurry is caused to enter the inlet port, pass through the resin and exit through the outlet port. The column heated to 60° C. and was packed with 53.3 cm (21 inches) of a weak acid cation exchange resin obtained from Rohm & Haas, designated as "IRC-50, H+". A flow rate of 17-30 ml/min and a protein feed slurry temperature of 63° C. was used. The column also contained a 7.6-15.2 cm (3-6 inches) layer of graded quartz at the bottom and a 10.1-15.2 cm (4-6 inch) layer of polystyrene beads at the top to prevent resin loss. The ion exchange column was operated in an upflow mode. As used herein and in the claims "upflow mode" is understood to be a column mode in which the column is oriented substantially vertically and the protein slurry enters the column via an inlet port located at or near the bottom of the column and exits the column via an outlet port located at or near the top of the column. Eight and one half liters of 5% soy protein isolate slurry were passed through the column, and each liter fraction was collected. The resin column was rinsed with water, however, it was apparent that there was no appreciable flow through the column, so the resin was physically removed and rinsed. Pressure changes for this experiment are unknown as the pressure gauge was unknowingly malfunctioning.

Since phytate removal was insignificant and the batch results were not repeated, it was decided to check the effect of a lower operating temperature on the "IRC-50, H+" cation exchange resin to remove phytate more effectively. A 250 ml aliquot of previously unused "IRC-50, H+" cation exchange resin was placed into the column. The ion exchange column was operated in an upflow mode at a target flow rate of 30 ml/min using the same column conditions as listed previously, except that the temperature was held at 21° C. (both feed and column) throughout the run. Only one liter of the protein feed slurry was passed through the column as the pressure drop across the column quickly rose above safe operating conditions and the run was aborted.

Ambient column conditions were once again attempted for passage of the feed in an upflow mode. "IRC-50" weak acid cation exchange resin was substituted with "C-25" strong acid cation exchange material, hydrogen form. Once again, the run was aborted because of a blockage in the column and high pressure drop.

The "IRC-50" weak cation exchanger was once again evaluated, however a potassium form resin was used in the next experiment. The same column used in the previous experiment was repacked with "IRC-50" resin which had been converted to the potassium form using potassium hydroxide. Quartz and polystyrene beads were used as previously described. Four liters of 5% SUPRO® 1610 soy protein feed slurry were passed through the column upflow at a rate of approximately 20 ml/min. Samples were collected at liter intervals and were submitted for phytate and protein analyses. The column was backwashed with water, regenerated with 7% hydrochloric acid, slow rinsed, then fast rinsed with water. The "IRC-50" was then converted to potassium form with 5% potassium hydroxide.

None of the runs in this experiment produced significant removal of phytate. Fair flow characteristics were evident with the initial feed in the weak acid cation exchange column work. However, the column gradually had become plugged in such a manner that no flow through the column could be achieved. Apparently, the protein had passed through the isoelectric point pH (hydrogen form resin was not a feasible approach to this process, as the isoelectric point must be avoided to prevent a plugged column). Protein and phytate determinations were not made on these samples since the run was aborted when the column became plugged.

The hydrogen form weak acid cation exchange resin run at lower temperature did not help flow characteristics of the column. Once again, the media became plugged as the protein inside went through its isoelectric point, and flow through the column ceased as the pressure increased to 482 kPa very quickly. A similar phenomenon occured with the strong acid cation exchange resin. These results reinforced the conclusion that passage through the isoelectric point inside the column must be avoided at all costs. This also confirms the decision that the hydrogen resin forms cannot be used.

The potassium form weak acid cation exchange resin column exhibited much better flow characteristics than the hydrogen form cation exchange resins. Although pressure drop through six liters gradually reached 552 kPa, protein recovery appeared good throughout the run. However, with much disappointment, phytate removal did not occur. Therefore, an adsorption effect must have occurred with the extended contact time inherent to the batch treatment process. The weak acid cation exchange resin in the column mode does not adsorb the calcium or magnesium portion of the phytate molecule.

It is now projected, based on common ion exchange theories, that phytate removal by the weak acid action exchange resin in the batch mode occurred by adsorption and extended contact time. The column mode did not provide sufficient contact time for adsorption to occur.

EXPERIMENT IV

Experiments were then designed to remove phytate using interactions with the phosphate portion of the phytate structure. This would be accomplished using an anion exchange column system. A strong base anion exchange resin in the OH form obtained from Rohm and Haas under the trade designation "IRA-910" was chosen for this task. "IRA-910" is a macroporous, type II strong base anion resin, and is approved by the United States Food and Drug Administration (FDA) (after condition cycling) for use in processing edible products. As used herein and in the claims Type II strong base anion exchange resins are understood to be quaternary ammonium types of resins in which the four substitutuents on the nitrogen atom are a polymeric benzyl, two methyl groups, and an ethanol group. The 2.54 cm (1 inch) column described above was filled with 400 ml of "IRA-910". Three liters of 5% SUPRO® 1610 soy protein feed slurry at ambient temperature were then passed through the 71° C. heated column upflow at a flow rate of 30 ml/min. Samples were collected at liter intervals and were analyzed for protein and phytate content. The run was aborted, however, because the initial pH of the effluent stream was thought to be too high (>10). High pH is very undesirable because of the formation of lysinoalanine at a pH of greater than 10 in protein. Experiments on this column were quickly suspended.

The "IRA-910" strong base anion exchanger (OH form) was once again checked for effectiveness, this time in the downflow mode. As used herein and in the claims "downflow mode" is understood to be a column mode in which the protein slurry enters the column via an inlet port located at or near the top of the column and exits the column via an outlet port located at or near the bottom of the column. The column was run at approximately 21° C. at an attempted flow rate of 30 ml/min 5% SUPRO® 1610 soy protein. A high pressure drop (262 kPa on the first liter) resulted immediately when the "IRA-910" OH form column was operated in a downflow mode. This run was also quickly aborted. It is more effective to operate this column in a upflow mode. This is most likely because the beads themselves are acting as a filter to remove the insoluble portion of the soy protein.

Experiments using chloride form "IRA-910" were then initiated. 400 ml of "IRA-910" was placed into the column and conditioned with 10% sodium chloride followed by a water rinse. Two liters of 5% SUPRO® 1610 soy protein feed at a temperature of 71° C. were run through a heated column at a flow rate of 20 ml/min in an upflow mode. A third liter was run through the column at approximately 65 ml/min. Flow characteristics were excellent, and pressure drop through three liters was less than 138 kPa. Protein and phytate analyses were also very encouraging, with a low (less than 10%) protein loss and over 95% relative phytate reduction in the process. This level of phytate removal was seen even with the increased flow rate of 65 ml/min from 20 ml/min. Regeneration of the column with the salt solution also met with success, as the salt regeneration solution was high in phytate content, while relatively low in protein content.

EXPERIMENT V

Preliminary indications were that the "IRA-910" Type II strong base anion exchange resin in the chloride form merited further investigation for removal of phytate in soy protein. A 2.54 cm (1 inch) diameter water-jacketed column was filled with 250 ml of "IRA-910" strong anion exchange resin in the chloride form. The column was rinsed with 800 ml of 10% NaCl in the downflow mode, and was then rinsed with 400 ml of deionized water at a flow rate of 25-30 ml/min. The column was then fast-rinsed with deionized water, and backwashed carefully with additional deionized water.

These initial experiments using the "IRA-910" chloride form resin were unsuccessful because of the downflow operation of the column. Although protein solubility had improved significantly as a result of the modified slurry technique, a white insoluble material still remained at the top of the column. In effect, the beads themselves act as a filter in this mode.

Nine liters of a 5% protein feed slurry of SUPRO® 1610 at 71° C. were then screened through 50 mesh screen and run through the heated column in the downflow mode. The run was ended because of a high pressure drop across the column. The column was then backwashed with water. Residual protein was dissolved and phytate was removed from the resin with 4% sodium hydroxide. The column was then water rinsed and conditioned with (5%) hydrochloric acid.

The experiment was repeated with an identical column set up in a downflow mode using new "IRA-910" resin conditioned with sodium chloride. The run was once again ended because of high pressure drop across the column. The above experiment was again repeated with 500 ml new "IRA-910" resin, but was this time operated in the upflow mode. The resin was conditioned with sodium chloride (10%), then rinsed with water. Nine liters of 5% SUPRO® 1610 soy protein feed slurry at 60° C. were passed through a heated column. Samples were collected at liter intervals, and were submitted for phytate, protein, mineral profiles, and amino acid profiles.

The upflow experiment was duplicated following resin regeneration with sodium hydroxide and hydrochloric acid. Samples were collected through 6 liters, and were submitted for phytate and protein analyses. After 7 liters, the pressure drop had increased to about 344 kPA and the run was aborted.

Five to ten percent of strong base anion exchange resin sites are typically weak base in nature. These sites remained in the "HCl" form when the "IRA-910" was conditioned with hydrochloric acid. This resulted in available acid groups, which reduced the pH of the feed to its isoelectric point, precipitating the protein inside and around the beads. The white precipitated protein was also observed on the walls of the column. Very little (if any) phytate removal occurred during this run, most likely because of the blockage of the active sites by the precipitated protein.

Therefore, it became obvious that, in addition to exchanging the phytate sites on the resin with strong anion chloride sites, the weak anion sites retaining the "HCl" must also be replaced with an ion which would not alter the pH of the feed such that the protein reached its isoelectric point. The initial approach to solving this problem was to use a sodium chloride salt rinse after the hydrochloric acid regeneration to raise the column pH. The next experiments were designed to address the issue of post-regeneration pH.

Figure 2:
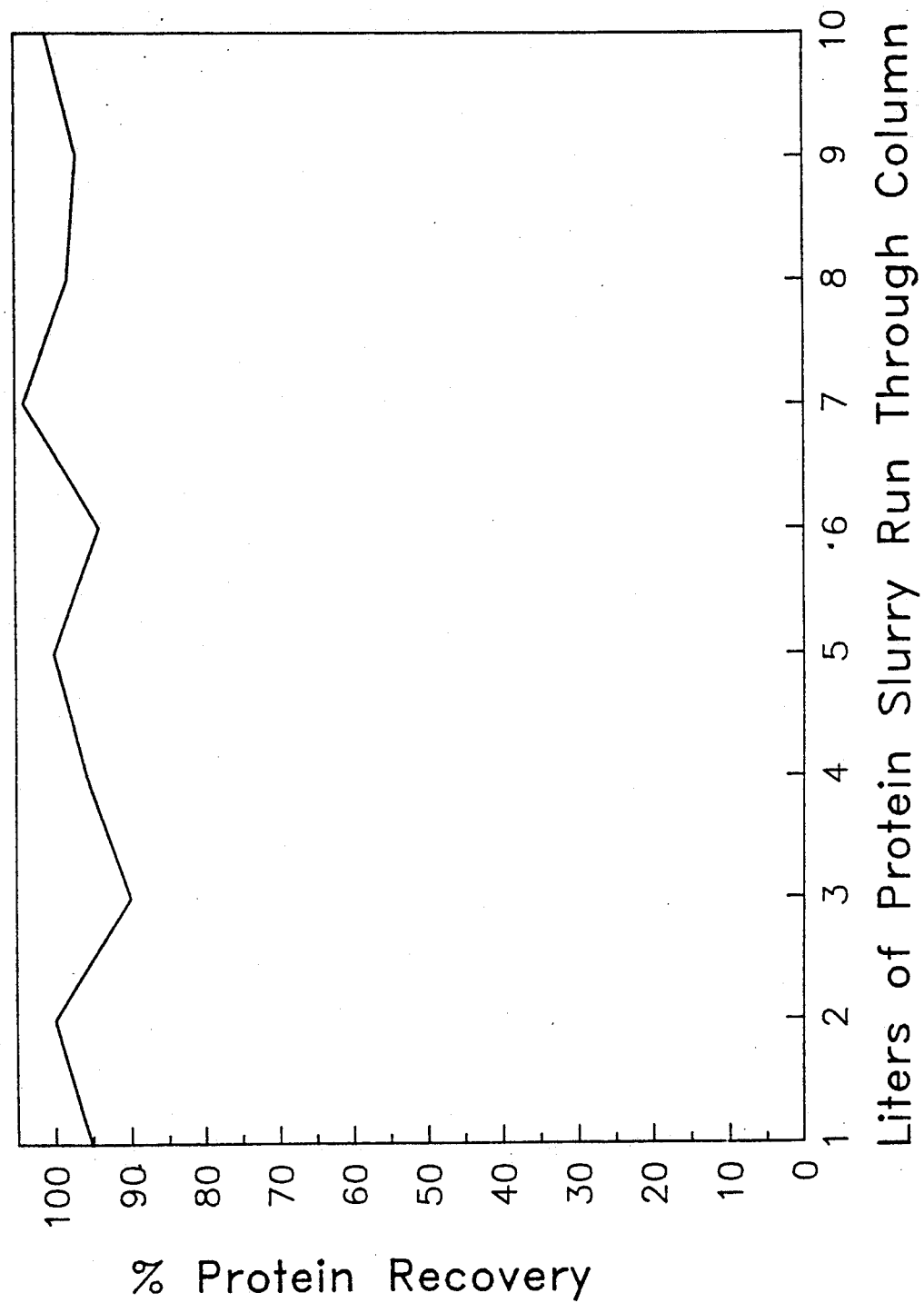
FIGS. 2 through 21 are graphs presenting the results of the experiments which are described herein.
Figure 3:
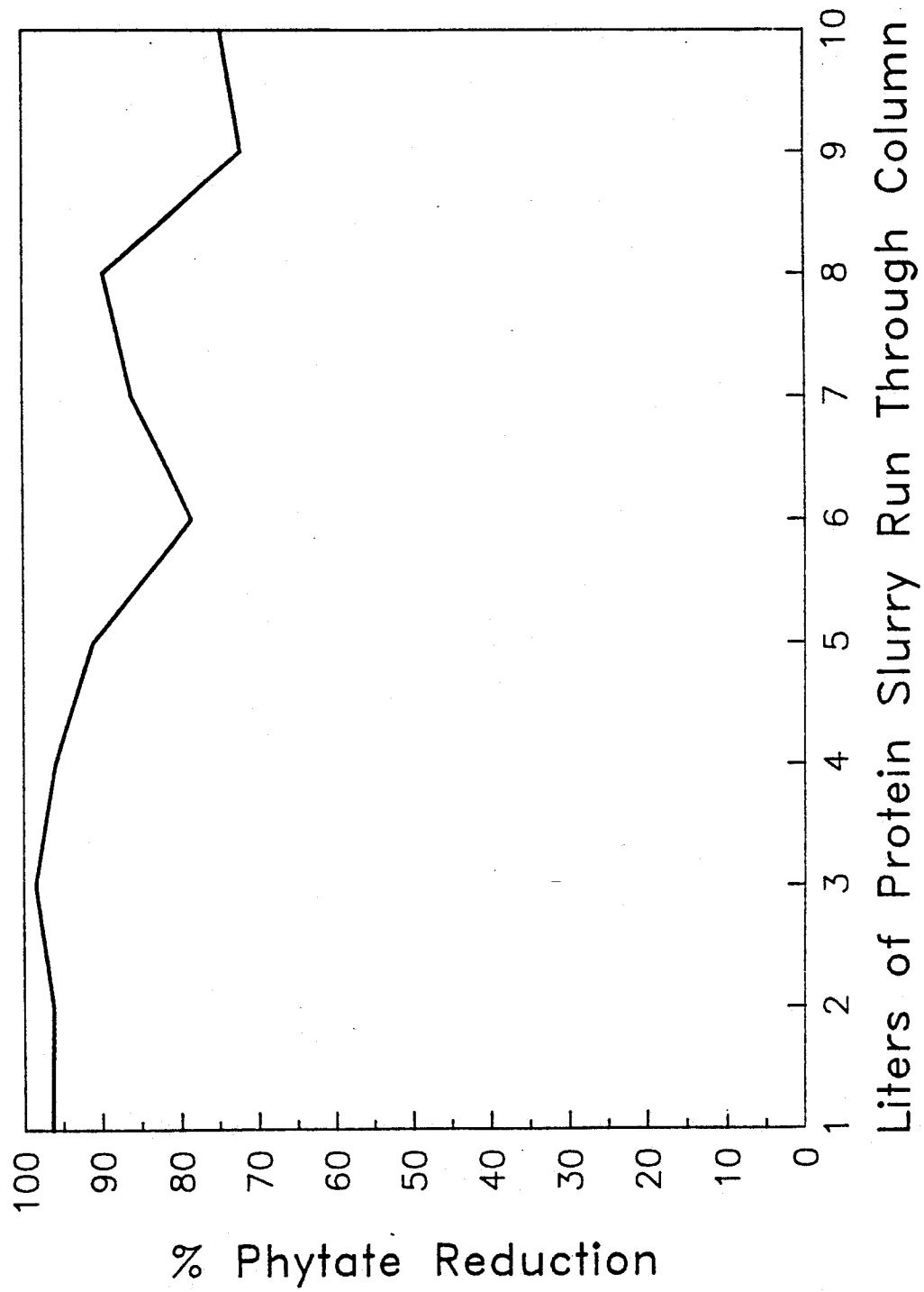

The chloride form strong anion exchange column run in the upflow mode was very effective in most aspects of the process goals. Good flow characteristics were achieved, and pressure drop throughout the run reached a maximum of 289 kPa after 9 liters of 5% SUPRO ® 1610 soy protein feed slurry had been passed through it. As shown in FIGS. 2 and 3 protein recovery and phytate removal were excellent. Approximately 70% of the phytate was recovered from the column in the sodium hydroxide rinse. Replacement of the sodium chloride conditioning with a hydrochloric acid conditioning solution should minimize any microbiological contamination, and assist in sanitizing the column and packing materials. The hydrochloric acid did not appear to remove any additional phytate from the column, however. In comparing mineral levels (the two left most columns of values in Table 4) of treated and untreated SUPRO ® 1610, it is apparent that levels are comparable in each element tested except for phosphorus and chloride. The figures which appear in the right hand column of Table 4 are from Experiment VII which will be described later. Phosphorus would be expected to be reduced because of the removal of phytate. Chloride levels would be expected to increase because of the ion exchange of chloride for phytate phosphorus. With regard to amino acids, the profiles of anion exchange treated, and untreated soy proteins show no significant differences (Table 5).

TABLE 4

MINERAL PROFILE COMPARISON
(Data in mg/100 g)

| Element | Untreated SUPRO ® 1610 | SUPRO ® 1610 through IEX (bench top) | SUPRO ® 1610 through IEX (8.3 cm column) |
|---|---|---|---|
| Calcium | 155 | 141 | 169* |
| Sodium | 1209 | 1228* | 1142 |
| Potassium | 78.0 | 76.3 | 88.9* |
| Magnesium | 36.3 | 34.4 | 56.7* |
| Phosphorus | 1139 | 438 | 444 |
| Iron | 11.7 | 11.7 | |
| Zinc | 3.01 | 3.52* | |
| Copper | 1.00 | 0.95 | |
| Manganese | 1.10 | 0.95 | |
| Chloride | 62 | 1060 | 366 |

*These increased values following the ion exchange procedure are attributed to variations in the SUPRO ® 1610 starting material and/or slight variations in the analytical procedures.

TABLE 5

AMINO ACID PROFILE COMPARISON FOR IEX SPI
(Data in mg/100 g protein)

| Amino Acid | SUPRO ® 1610 Untreated | SUPRO ® 1610 through IRA 910 Cl- |
|---|---|---|
| Aspartic Acid | 11.51 | 10.93 |
| *Threonine | 3.70 | 3.60 |
| Serine | 5.31 | 5.06 |
| Glutamic Acid | 19.39 | 18.40 |
| Proline | 5.20 | 5.11 |
| Glycine | 4.08 | 3.91 |
| Alanine | 4.06 | 3.99 |
| *Valine | 4.06 | 4.13 |
| *Methionine | 1.07 | 1.22 |
| *Isoleucine | 4.11 | 4.15 |
| *Leucine | 7.70 | 7.54 |
| Tyrosine | 3.85 | 3.75 |
| *Phenylalanine | 5.05 | 4.94 |
| Histidine | 2.45 | 2.39 |
| *Lysine | 6.07 | 5.87 |
| Arginine | 7.50 | 7.21 |

TABLE 5-continued

AMINO ACID PROFILE COMPARISON FOR IEX SPI
(Data in mg/100 g protein)

| Amino Acid | SUPRO ® 1610 Untreated | SUPRO ® 1610 through IRA 910 Cl- |
|---|---|---|
| *Tryptophan | 1.20 | 1.05 |
| Cystine | 1.29 | 1.27 |

EXPERIMENT VI

Backwashing the "IRA-910" resin used for Experiment V was attempted, but since protein still visibly blocked the column, the resin was removed from the column and the solid protein was removed by washing and screening. 350 ml of the resin was placed back into the column, and was then contacted with 80 kg/m³ of 5% HCl per cubic meter followed by a slow rinse. The column was then conditioned further with 80 kg/m³ of sodium chloride (as 10% NaCl). A water rinse followed.

A 5% SUPRO ® 1610 soy protein isolate slurry at 60° C. was fed through the column. Flow was upflow at a rate of 20 ml/min. Samples were collected at liter intervals through eight liters, and samples were submitted for protein and phytate analyses.

Figure 4:
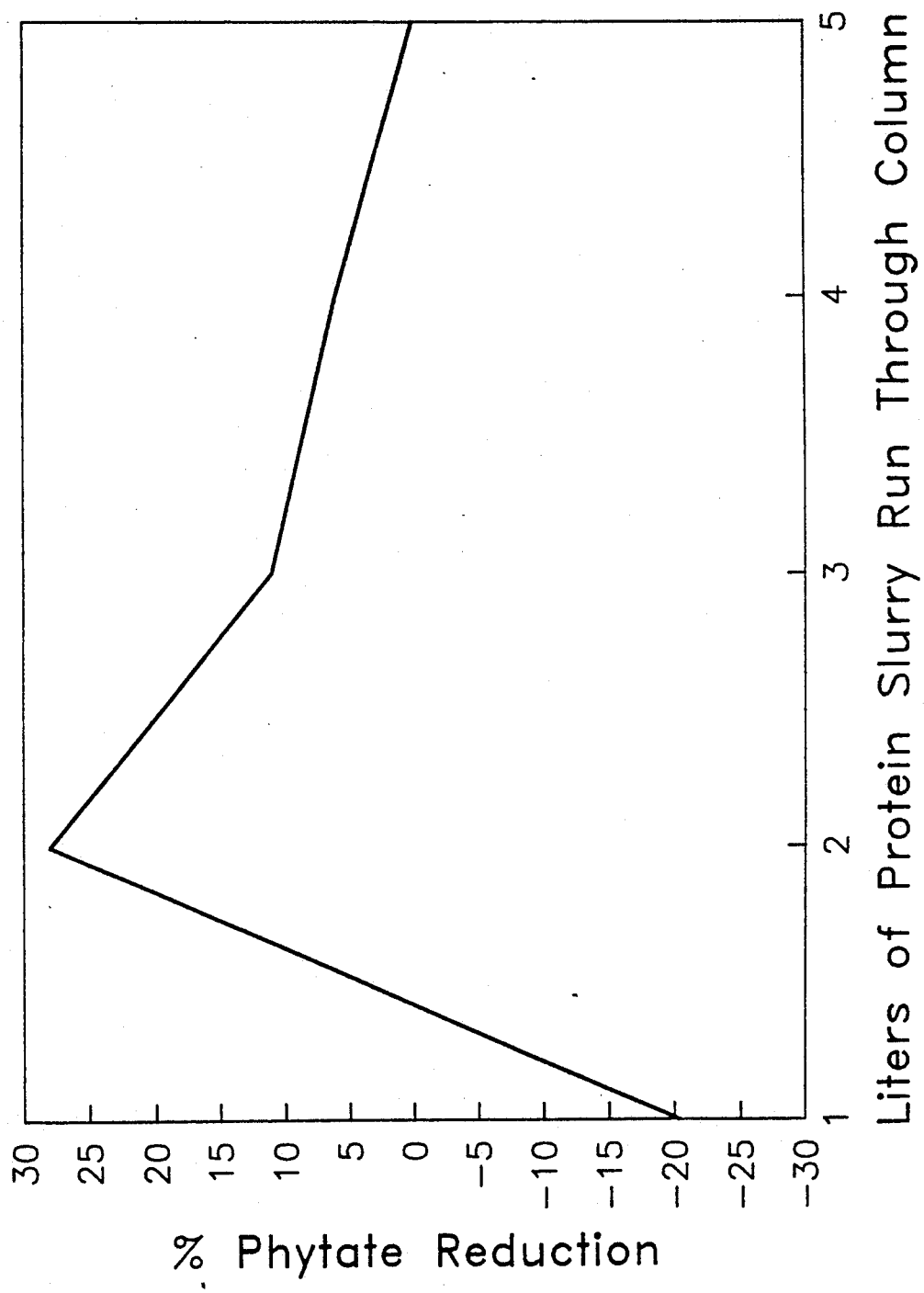

Initial experimentation with regeneration of the chloride form "IRA-910" yielded unexpected results. Previously used resin, washed with sodium hydroxide and hydrochloric acid, then conditioned with sodium chloride still exhibited some visible protein hang-up in the column, though pressure increases were not as extreme as had been seen previously (276 kPa through 8 liters). The most startling finding from this experiment was that the "IRA-910" anion exchanger did not significantly remove phytate, as illustrated in FIG. 4. It is hypothesized that this occurred because the final salt rinse did not replace the weak anion HCl sites on the resin, hence, the protein precipitated (pH change), and blocked all the active sites such that no phytate phosphorus could be adsorbed onto the resin. As the pressure drop had once again increased, and protein precipitation was visible in the column, the resin once again was physically removed from the column and soaked in (6%) sodium hydroxide for 18 hours. The resin was reloaded into the column, converted to chloride form with hydrochloric acid (1%) followed by a water rinse. A final rinse of sodium chloride (adjusted to a pH of 9 with sodium hydroxide) was used in an attempt to neutralize all weak base sites which may have remained in the hydrochloric acid ionic state. The pH of the effluent was monitored throughout the regeneration process in efforts to determine the point at which all weak anion exchange sites (HCl) had been neutralized.

As the pH of the resulting effluent did not increase as high as expected, it was concluded that the weak base anion sites had still not been replaced. Therefore, the column was rinsed with one resin bed volume of 1.6% sodium carbonate in a downflow manner. Subsequent rinsing with water was once again performed.

Nine liters of 5% SUPRO ® 1610 soy protein feed slurry at 60° C. was fed upflow through the column of 350 ml "IRA-910" maintained at 60° C. Eluant was collected at liter intervals, and submitted for protein and phytate analyses.

Regeneration of the column was again attempted. 6% sodium hydroxide was pumped through the column in an upflow manner. This was allowed to sit in the column over night, followed by a water slow rinse and a fast rinse to a conductivity of less than 2000 μmhos. 1% hydrochloric acid was then pumped through the column, followed by a slow and fast rinse to a conductivity of less than 200 μmhos. The column was then rinsed with 1.5% sodium carbonate, followed by slow and fast rinses to a conductivity of less than 200 μmhos. Six liters of 5% SUPRO® 1610 soy protein isolate feed slurry were then processed at a column temperature of 60° C. upflow at a flow rate of 20 ml/min. One liter increments were analyzed for protein and phytate content.

Before this resin could be regenerated, it had to once again be physically removed from the column. The resin "soak" in the sodium hydroxide was found to be very effective in protein dissolution. This is crucial for effective regeneration, and should be incorporated into the final process. The HCl rinse, converting the resin to chloride form, followed by a water rinse, then sodium chloride at pH 9, did not yield as high a pH as expected. This was indicative that the HCl weak base anion exchange sites were still not being exchanged, hence pH would still be a problem as the protein would still be passing its isoelectric point, thus would "freeze" the column.

From a microbiological standpoint, the use of sodium hydroxide followed by hydrochloric acid is more efficacious than the use of sodium chloride. The use of a base, followed by acid, is very conducive to sanitary conditions. Therefore, it was decided that this HCl rinse was also a crucial part of the process. It was further observed that following the conditioning procedure the HCl gave off a strong sulfur odor, which clearly indicated that sulfur containing compounds (for example sulfites and sulfates) had been removed from the protein starting material by the ion exchange process. Also, it was observed that following the conditioning procedure the sodium hydroxide had a yellow appearance which clearly indicated that phenolics had been removed from the protein starting material by the ion exchange process.

Figure 5:
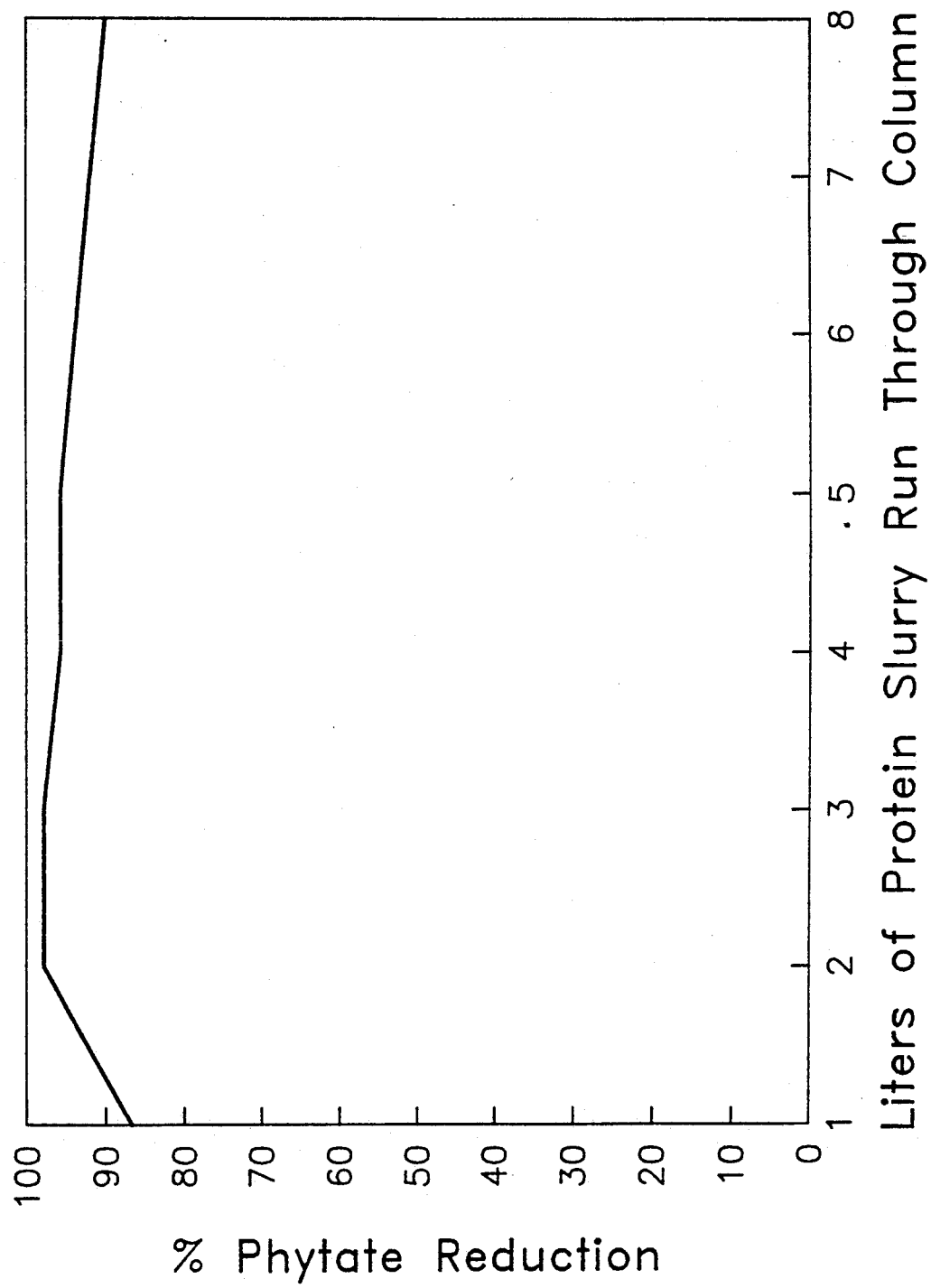
Figure 6:
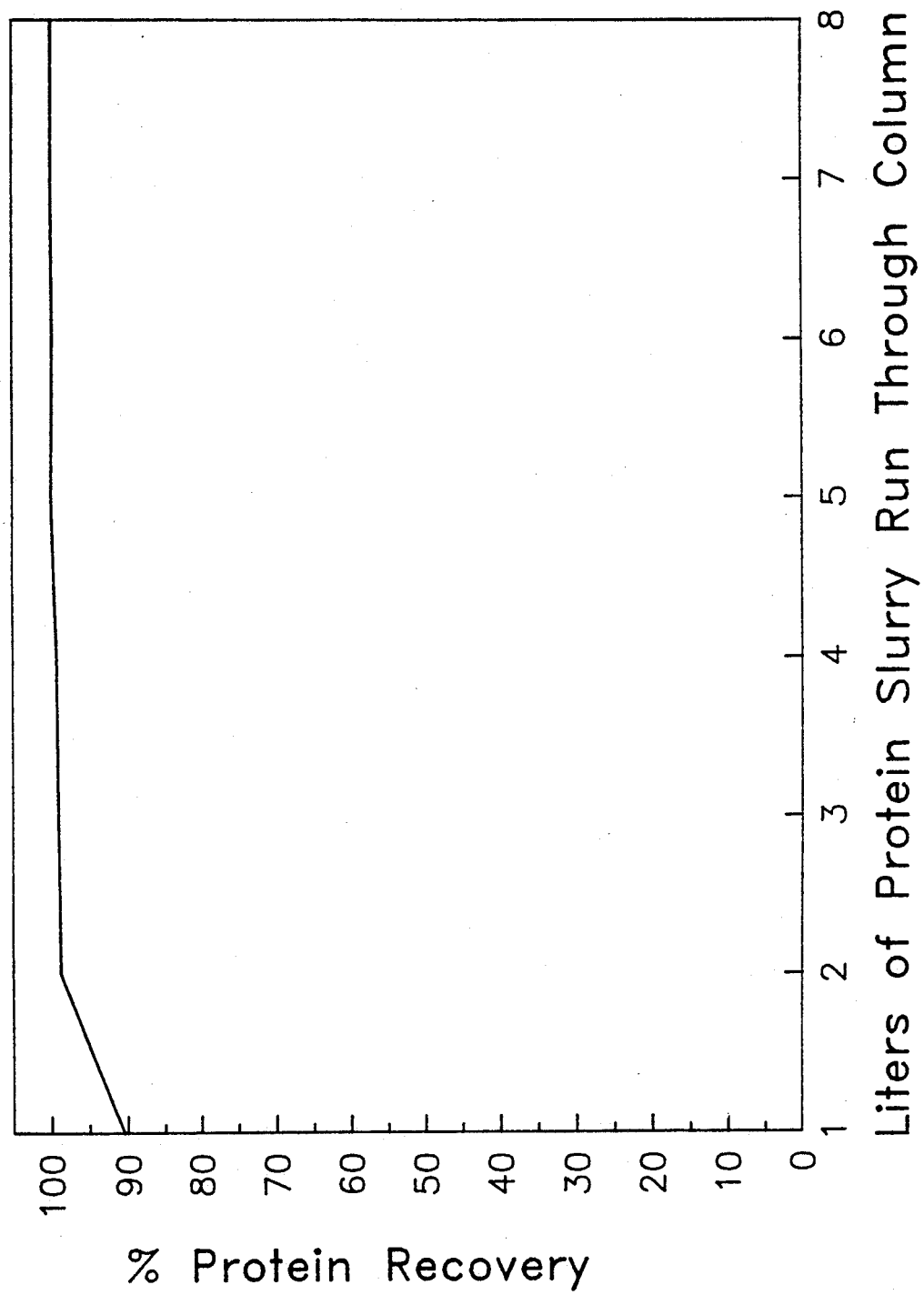

The addition of a final sodium carbonate rinse was, indeed, the answer to neutralization of the weak base anion sites. During the final water rinse, the pH of the effluent reached > 10, which is indicative of the successful exchange of carbonate for the weak base anion HCl. The passage of nine liters of the 5% SUPRO® 1610 protein through the column was accomplished with a much lower pressure increase than had previously been possible—the pressure after the seventh liter was 207 kPa. Referring now to FIGS. 5 and 6 phytate and protein analyses were also very encouraging as approximately 94% of the phytate was removed, with a protein recovery of greater than 95%. There was no visible protein particulate matter remaining in the column.

Figure 7:
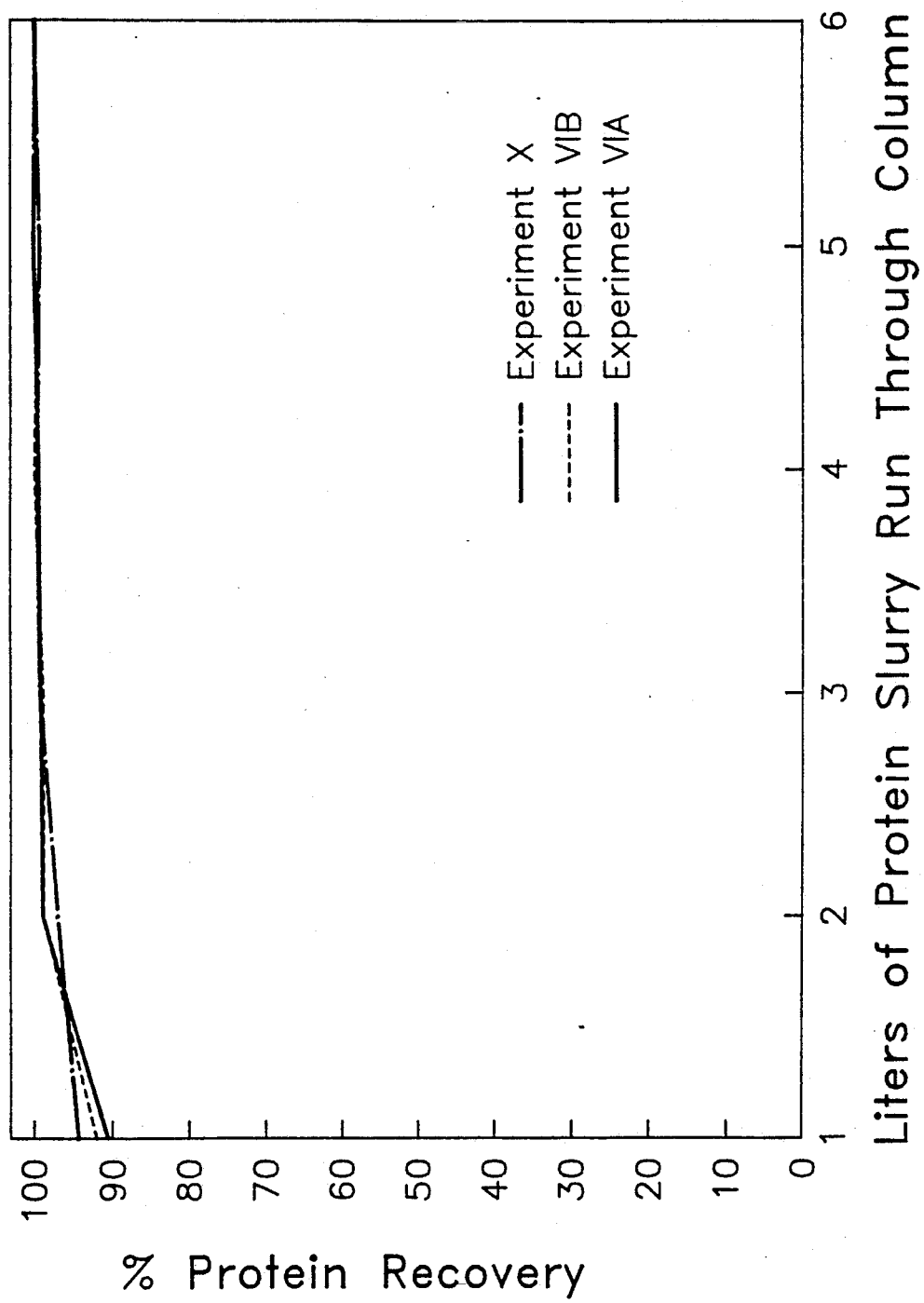
Figure 8:
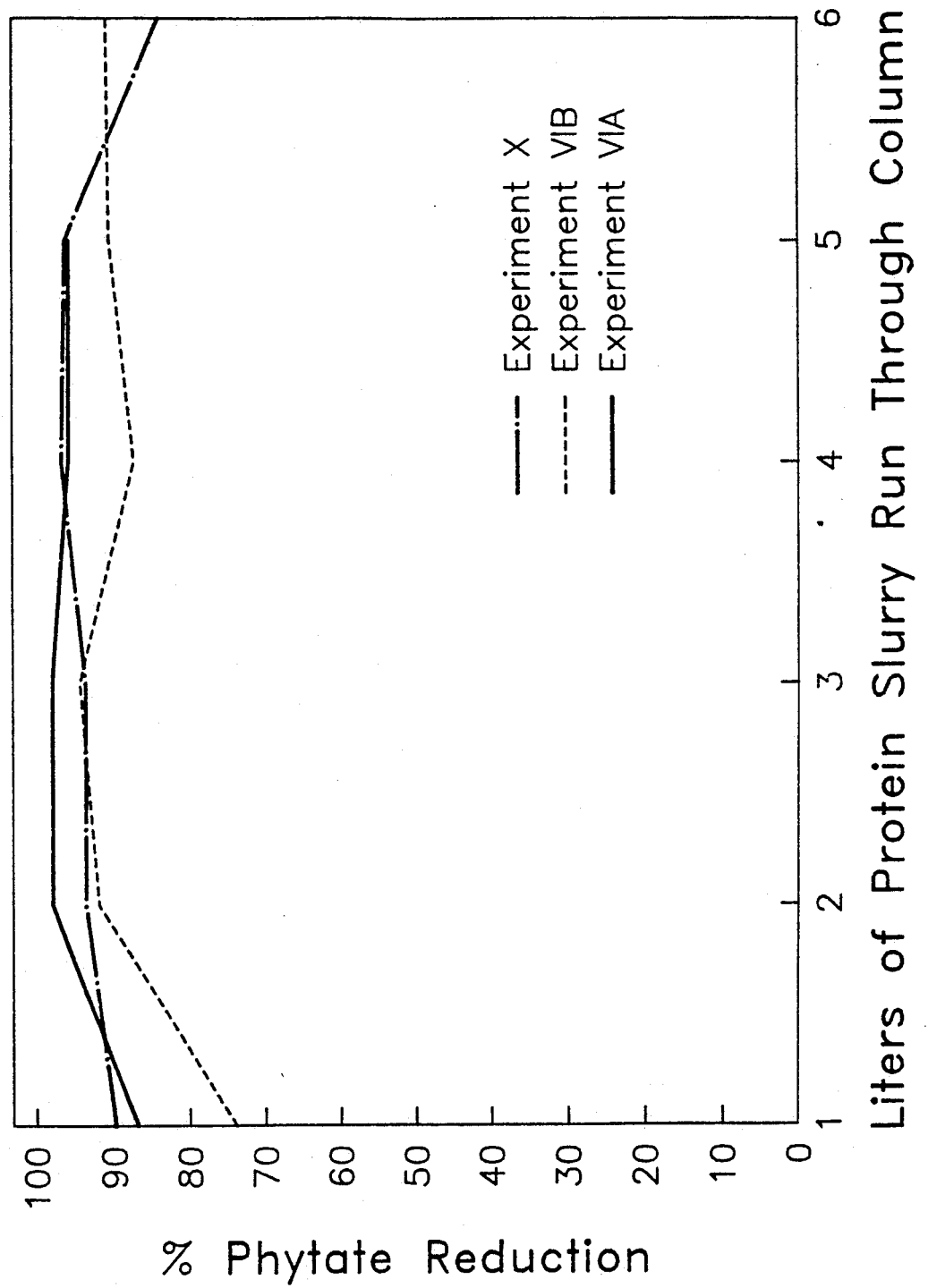

The regeneration cycle was further identified with the next experiment. The soaking of the resin in sodium hydroxide seemed to effectively clean the column as a true fluidized bed could be observed with no apparent protein globules present. This confirmed the need to have this sodium hydroxide "soaking" step in the final process. The final carbonate rinse once again enabled the pH of the final water rinse to elevate above 9, indicating that the weak acid anion exchange sites had been exchanged for carbonate. The protein processed through the column also exhibited excellent phytate removal (>87% through 6 liters), and a protein recovery of over 93%. Additionally, pressure drop through the 6 liters processed was less than 138 kPa. FIGS. 7 and 8 show the protein recovery and phytate removal using the "IRA-910" (chloride form) resin with prior sodium carbonate regeneration.

EXPERIMENT VII

The process was then attempted in a scaled-up version. An 8.3 cm (3 ¼ inch) diameter column was filled with 4.1 liters (76 cm) of "IRA-910" strong base anion exchange resin in a chloride form. The resin was conditioned with alternate sodium hydroxide and hydrochloric acid washes. A final sodium carbonate wash was also used to neutralize weak base anion sites. The column was rinsed to a conductivity of less than 250 μmhos. The calculated regeneration dosages were extrapolated for the larger resin volume. Concentrations of all influent regenerants and conditioners remained the same as for the runs described in EXPERIMENT VI.

Fifty two liters of 5% SUPRO® 1610 soy protein feed slurry at 60° C. were passed through the column in an upflow mode at 280 ml/min. The water-jacketed column was heated to 60° C. Eluant was collected at about 17.5 liter increments, and samples were submitted for fat, total solids, protein, chloride, mineral, and phytate analysis.

Figure 9:
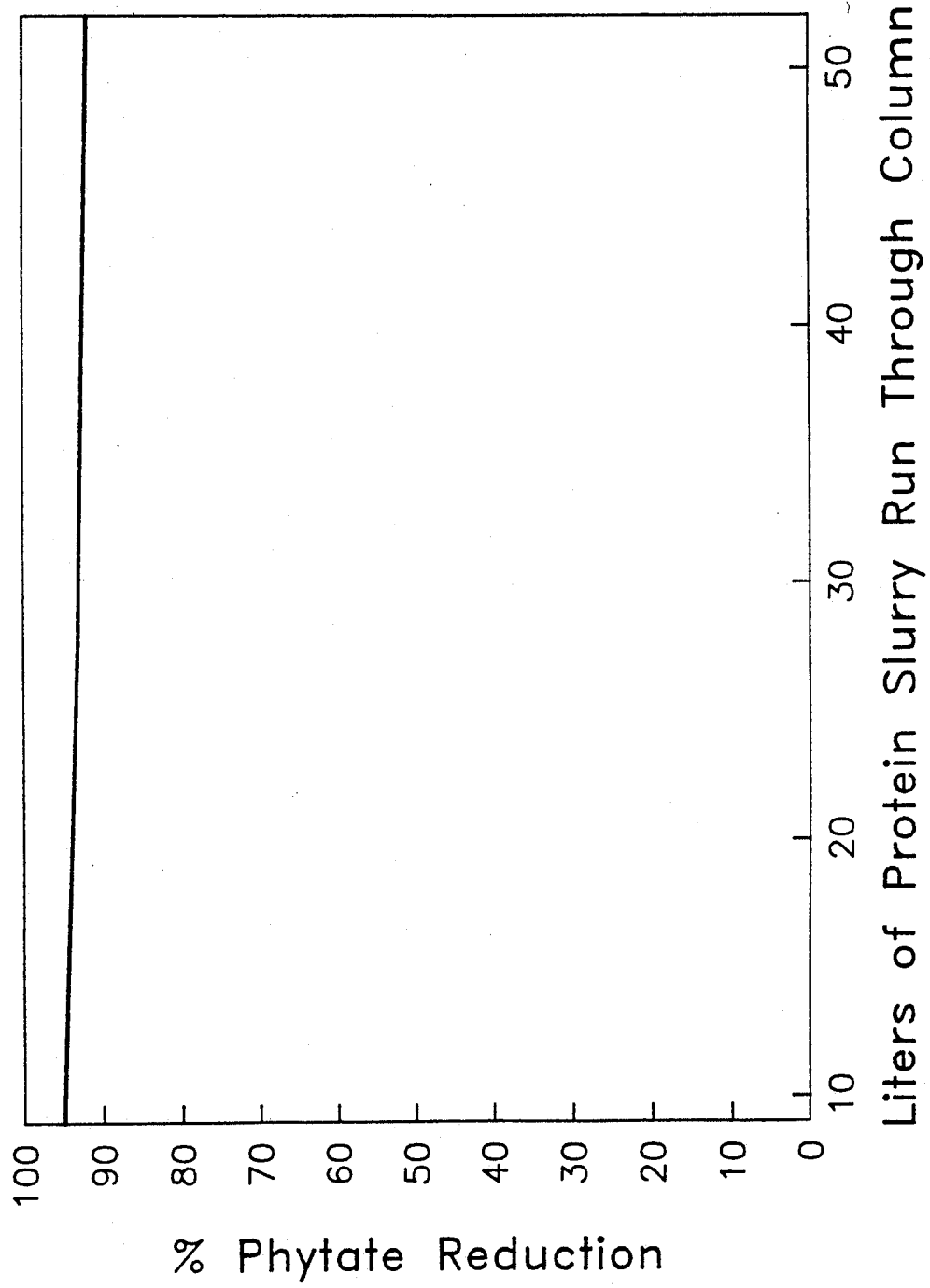
Figure 10:
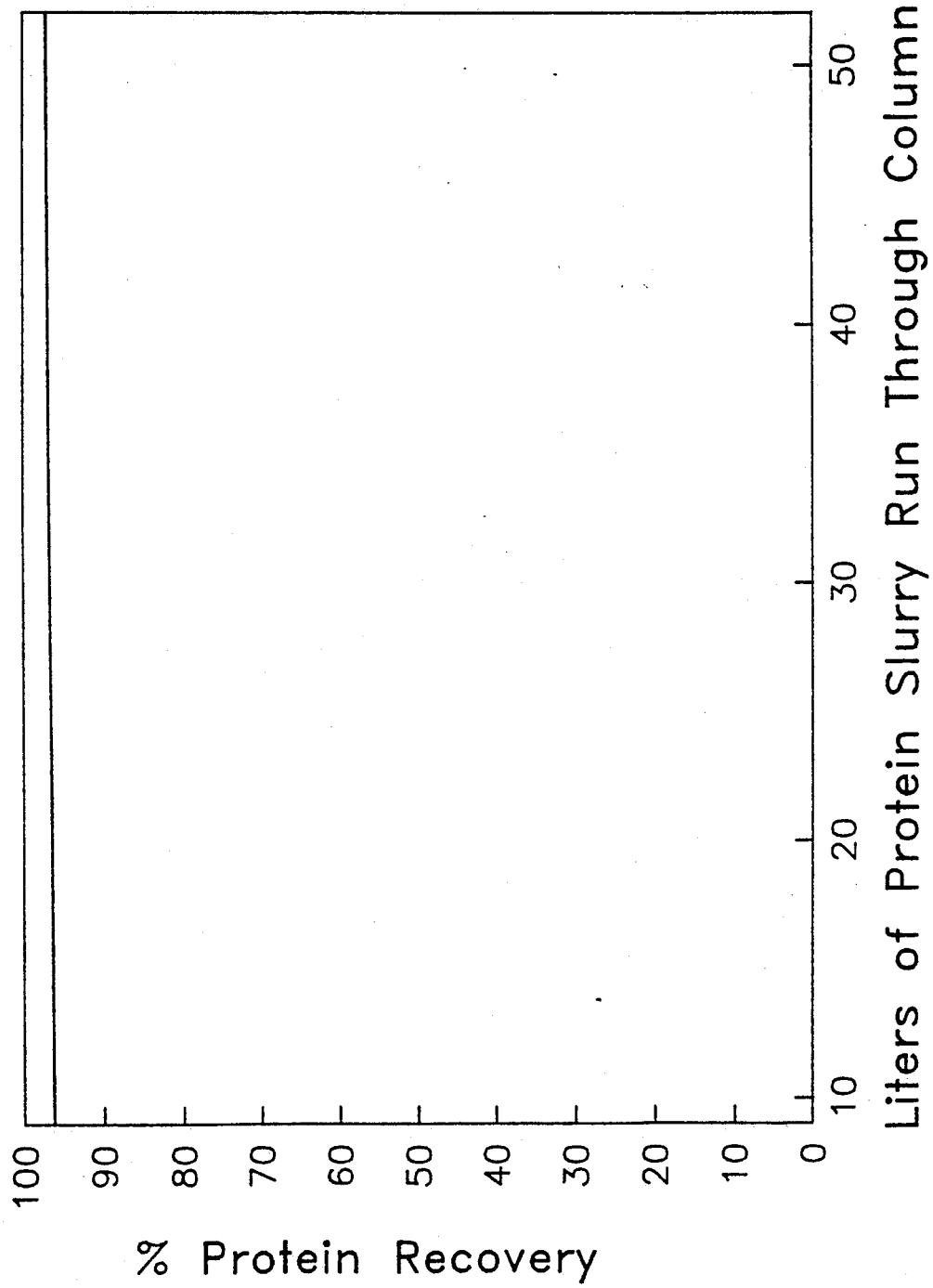

The run through the scaled up 8.3 cm (3¼ inch) diameter column was considered very successful. Pressure drop throughout the 52 liter run never exceeded 220 kPa. As shown in FIGS. 9 and 10, the protein met specifications analytically, with greater than 93% phytate removal, and greater than 95% protein recovery. The mineral profile was also excellent, and chloride was much lower than in previous ion exchange runs, most likely because of the carbonate regeneration portion of the conditioning the column of values on the right in (Table 5). Fifty two liters were processed through the column in less than 4 hours. This trial proved the feasibility of a scaleable process.

EXPERIMENT VIII

Since optimal regeneration parameters had been further identified, the lab scale 2.54 cm (1 inch) diameter column was operated in the downflow mode. Using sodium hydroxide and hydrochloric acid rinses, and the final sodium carbonate conditioning, the column was prepared for protein processing. 5% SUPRO® 1610 soy protein feed slurry at 71° C. was processed downflow, through 330 ml of "IRA-910", chloride form resin at a flow rate of 20 ml/min. Samples were then analyzed for phytate and protein content. The pressure drop at the end of six liters effluent was greater than 413 kPa.

Figure 11:
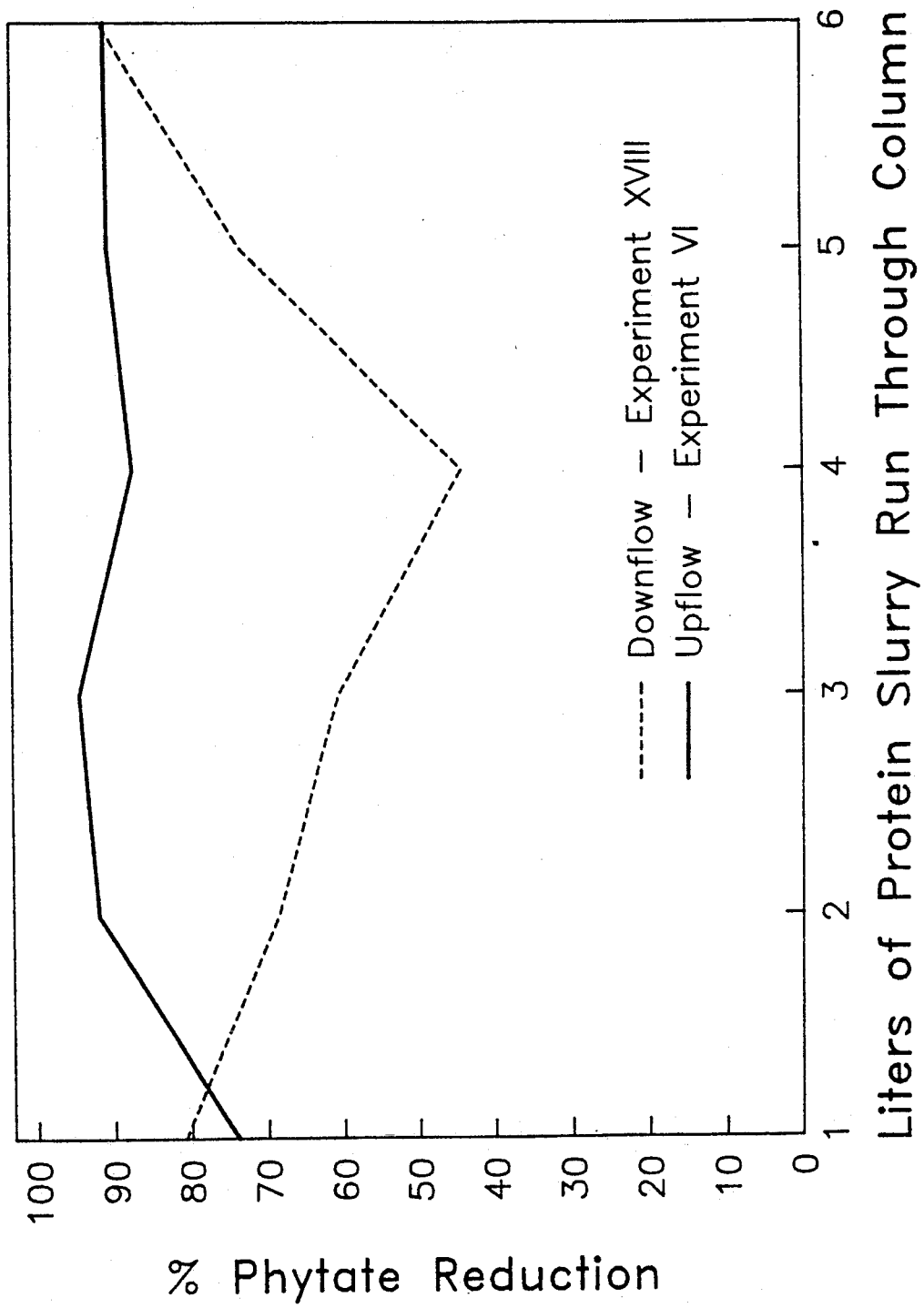

The carbonate rinse definitely improved flow characteristics of the process over those previously seen in previous downflow mode experiments. No protein globules were evident in the walls of the column, but the pressure drop did increase to approximately 427 kPa through six liters. Though protein recovery was still good, phytate removal did not occur at the levels which had been attained with the system operated in the upflow mode, as is shown in FIG. 11. This may be because of surface contact area, contact time, or a channeling effect. It was therefore concluded that the upflow mode is preferred in order to achieve more phytate removal.

EXPERIMENT IX

To better define the effect of temperature on the ion exchange phytate removal process, the 2.54 cm (1 inch) diameter column system was run at ambient temperature. "IRA-910" chloride form strong base anion exchange resin from EXPERIMENT VIII was regenerated using the sodium hydroxide, hydrochloric acid, sodium carbonate protocol described above. The 5% SUPRO ® 1610 was slurried, cooled to room temperature, and passed through the column in an upflow mode at a flow rate of 20 ml/min. Protein and phytate content were determined at each liter interval. The column process operated at room temperature (21° C.) met with minimal success. The pressure increased to 413 kPa after six liters had passed through the column. Protein recovery was acceptable, however, phytate removal decreased to an average 55% phytate reduction.

Figure 12:
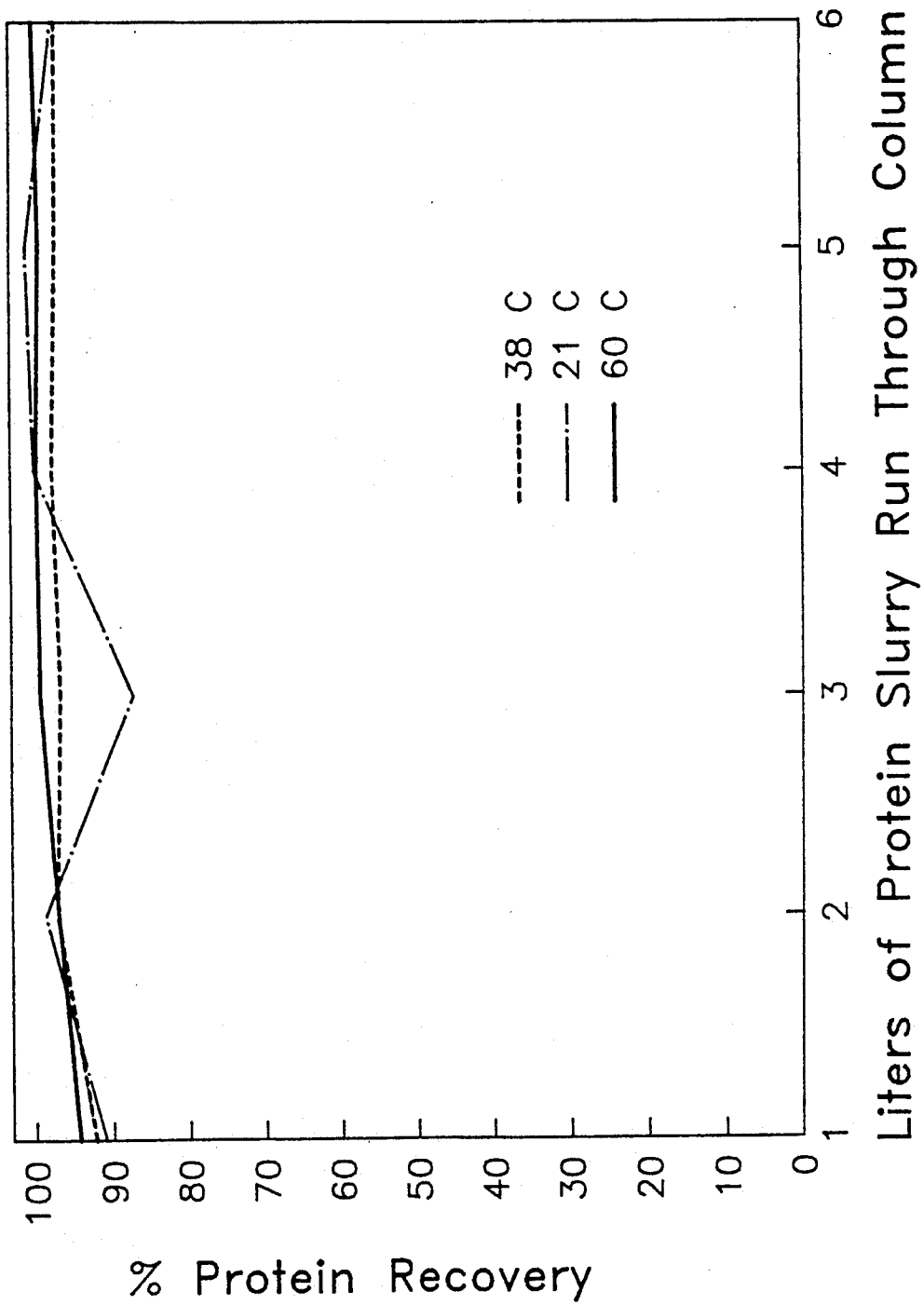
Figure 13:
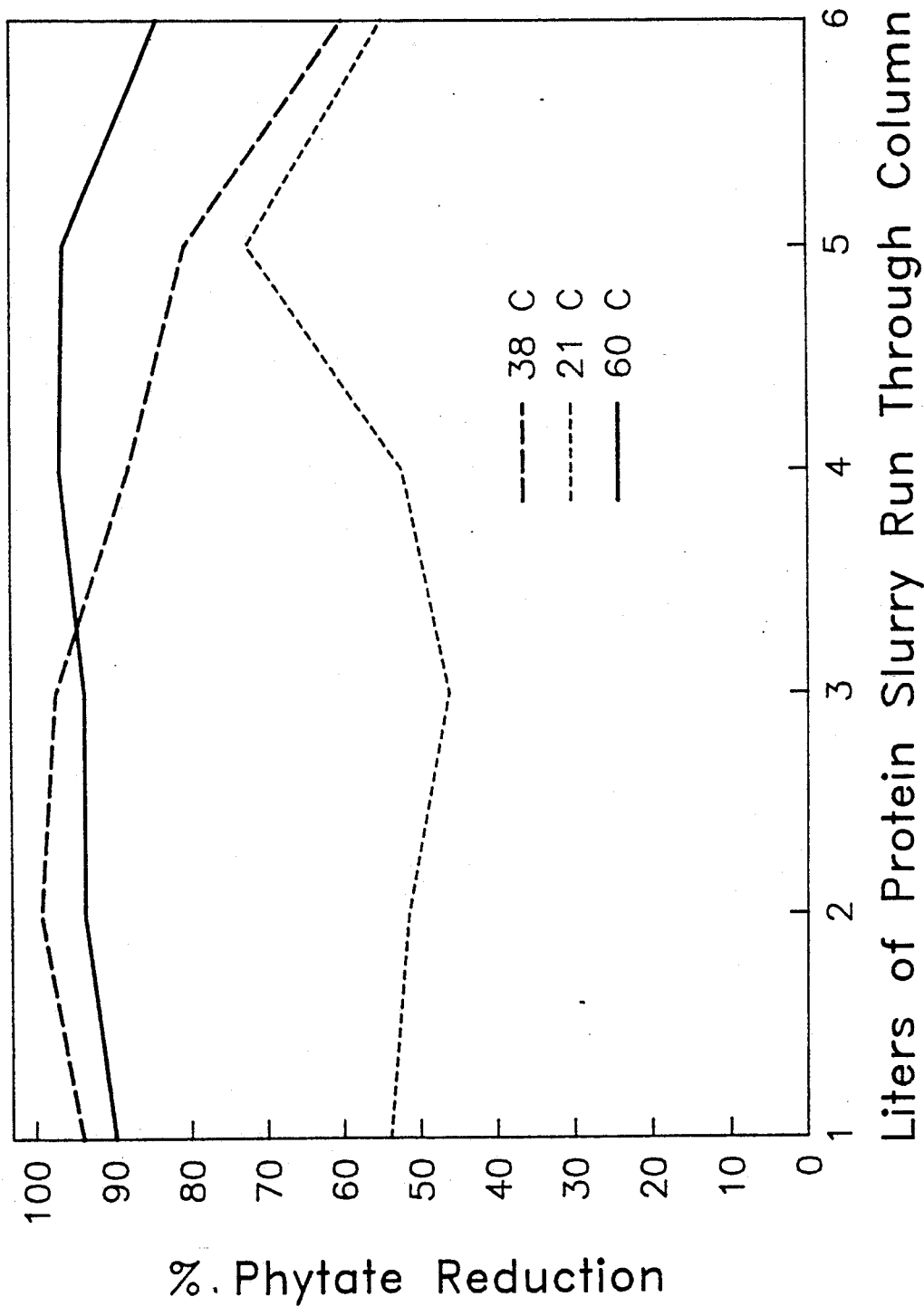

A decrease in phytate removal was observed with the ambient temperature run. A second run was made using the same resin with the conditions duplicated except for elevating and maintaining the temperature of the feed to be 60° C. Protein and phytate determinations were also made on these samples. The comparison shows a true temperature effect, which is evident in FIGS. 12 and 13, as the elevated temperature run was processed following the ambient temperature run, verifying resin integrity. A run was then made using the same resin with the conditions duplicated except for elevating and maintaining the temperature of the feed to be 38° C., and although phytate removal was better than at 21° C., it was poorer than at 60° C. This is indicative of the importance of temperature in the ion exchange process.

EXPERIMENT X

Experiments were conducted to determine the effect of an increased hydrochloric acid conditioning in the regeneration process on phytate removal. 5% hydrochloric acid was used instead of 1% hydrochloric acid in the post-sodium hydroxide conditioning step. Seven liters of 5% SUPRO ® 1610 feed slurry were run through the column upflow at 60° C. Measurements of protein and phytate concentration were made at one liter increments.

Figure 14:
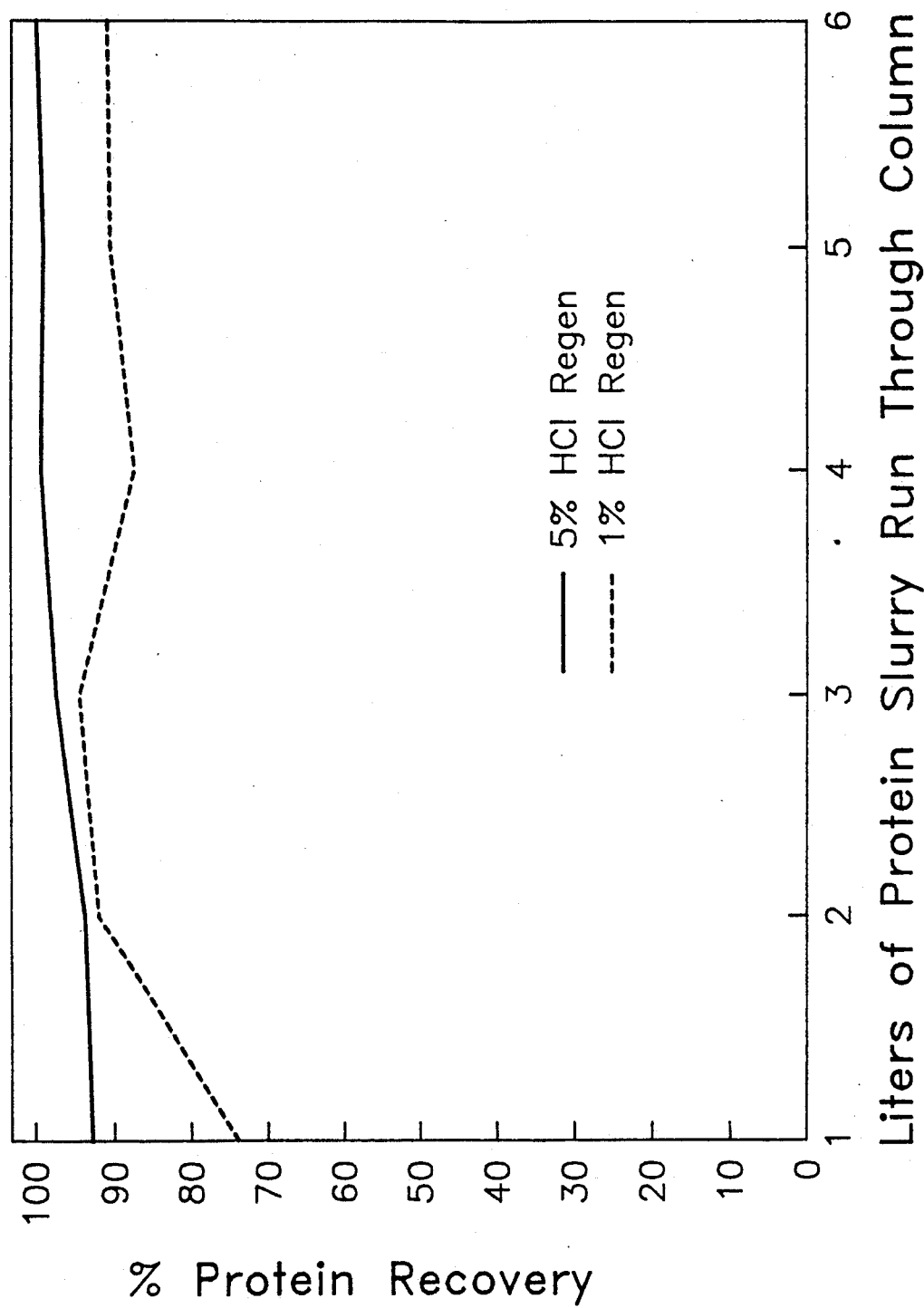
Figure 15:
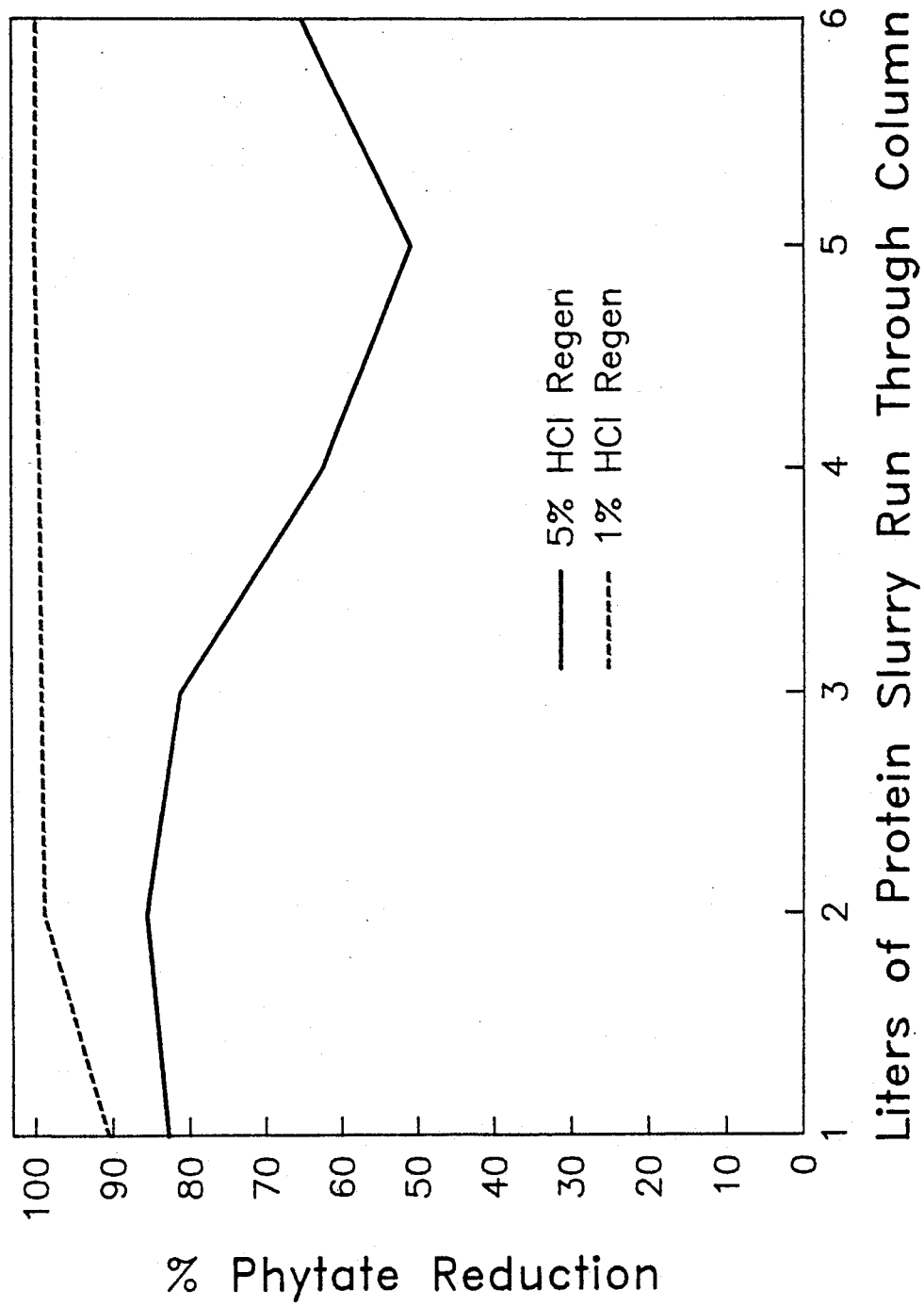

An increase in hydrochloric acid concentration from 1% used previously to 5% was not advantageous in the phytate removal process. FIGS. 14 and 15 show that phytate removal was decreased following this conditioning procedure. The increased hydrochloric acid concentration apparently affects the resin exchange sites and decreases resin efficiency.

EXPERIMENT XI

Strong base anion exchange resins from other vendors were also screened for applicability to the ion exchange process for phytate removal from soy protein. "Dowex 22" obtained from Dow Chemical U.S.A., 2040 Willard H. Dow Center, Midland, Mich. 48674 U.S.A. and "Ionac A651" obtained from Sybron, Sybron Chemical Division, Birmingham Road, Birmingham, N.J. 08011 U.S.A. were evaluated for effectiveness using the same conditions as were used for the "IRA-910". Five liters of 5% SUPRO ® 1610 feed slurry were run through the column, and protein and phytate were determined at liter intervals for each.

Figure 16:
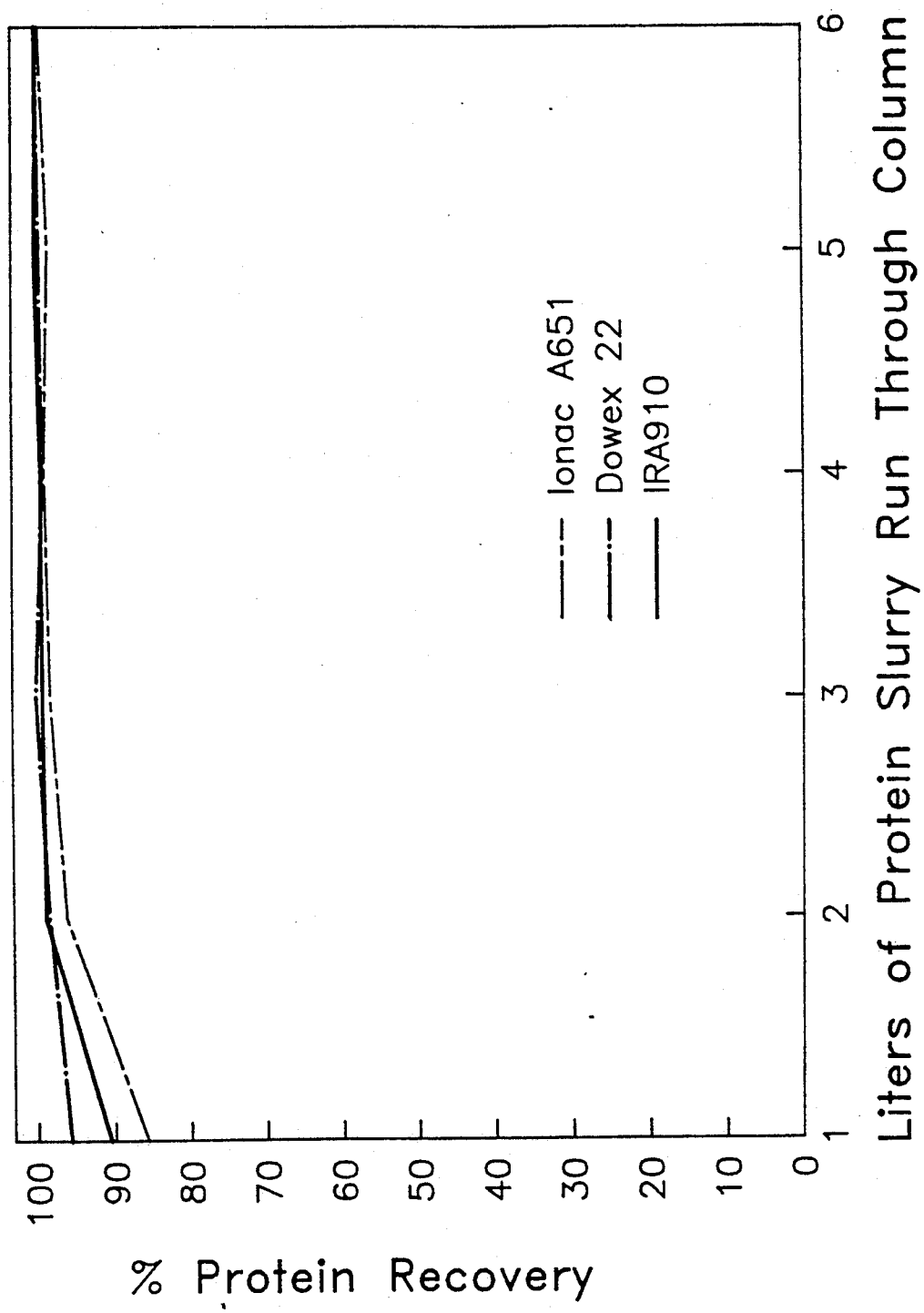
Figure 17:
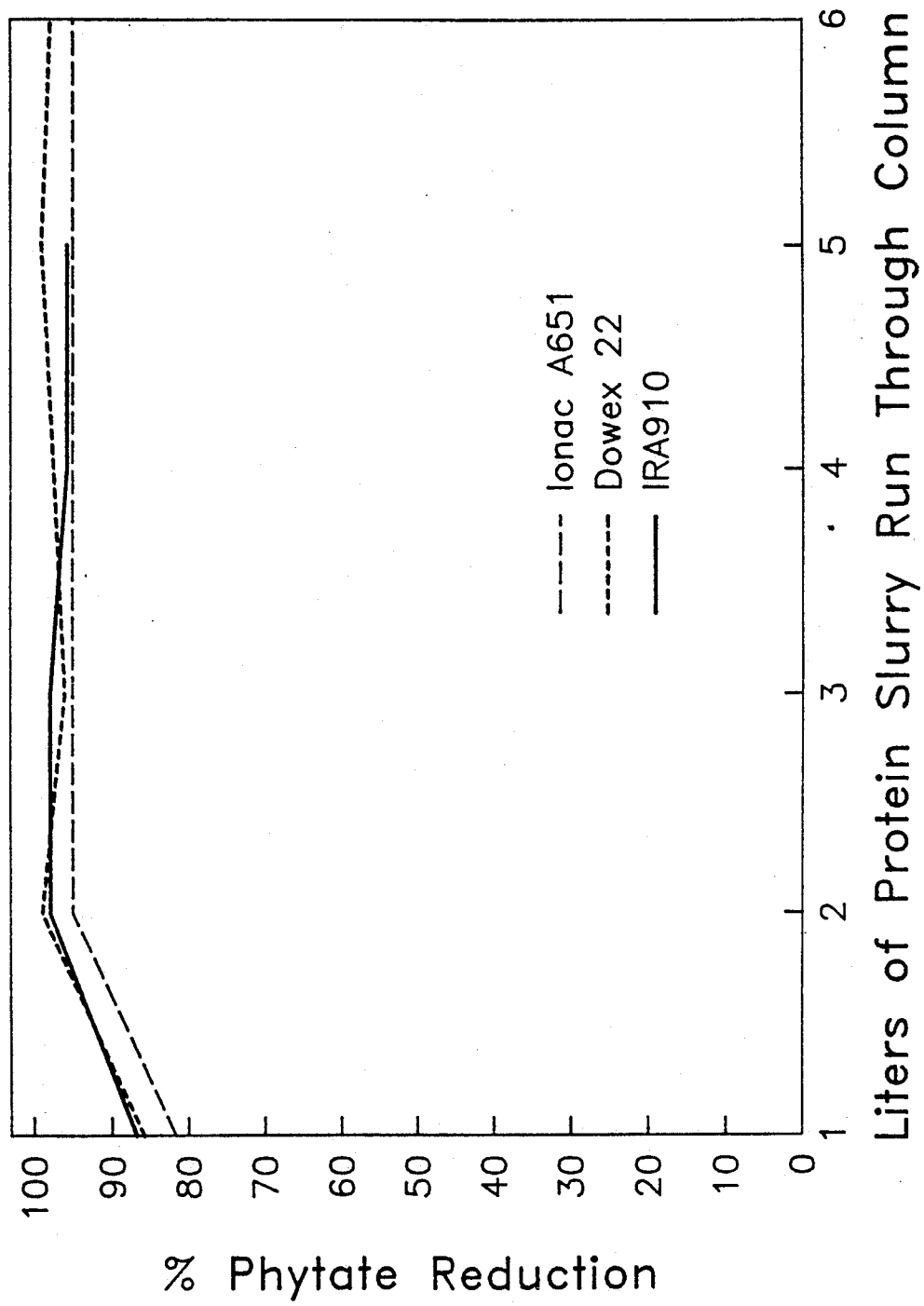

Protein recoveries and phytate reduction obtained using the "Dowex 22" and "Ionac A651" strong anion exchangers are shown in FIGS. 16 and 17. This indicates that other strong base anion resins may be used to obtain similar results in the removal of phytate from soy protein.

EXPERIMENT XII

The applicability of other resin forms to the removal of phytate from protein using an ion exchange process was also studied. "IRA910" ($0.003m^3$) was converted to the sulfate form using 3500 mL of 1% sulfuric acid. Following slow and fast water rinses to a conductivity of less than 2,000 $\mu$mhos, the resin was neutralized with 1 liter of 1.5% sodium carbonate, and rinsed once again with water to attain a conductivity of less than 50 $\mu$mhos. Six liters of 5% SUPRO ® 1610 were passed through the column at 60° C. Samples were collected at liter intervals and analyzed for protein and phytate content.

Figure 18:
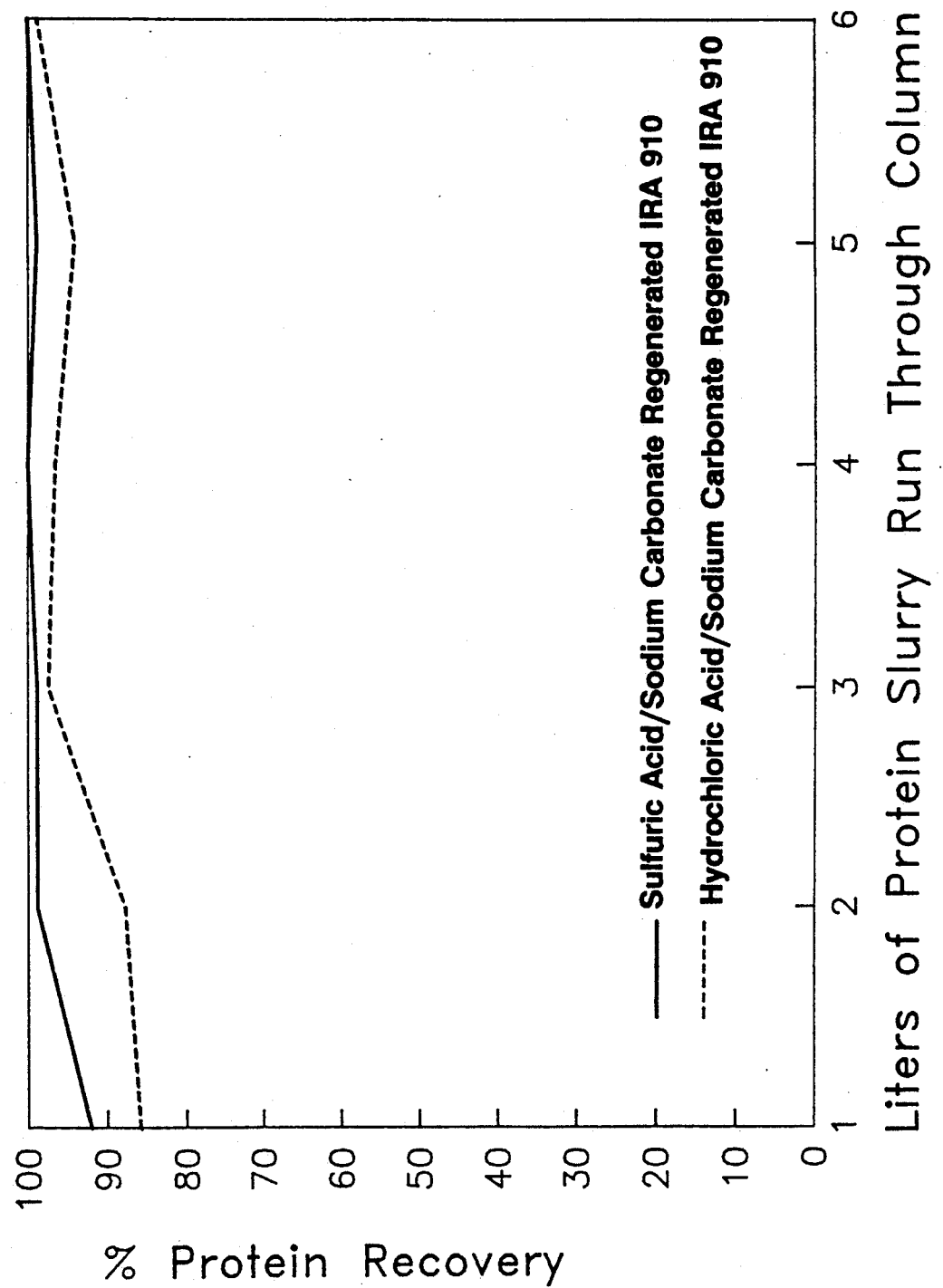
Figure 19:
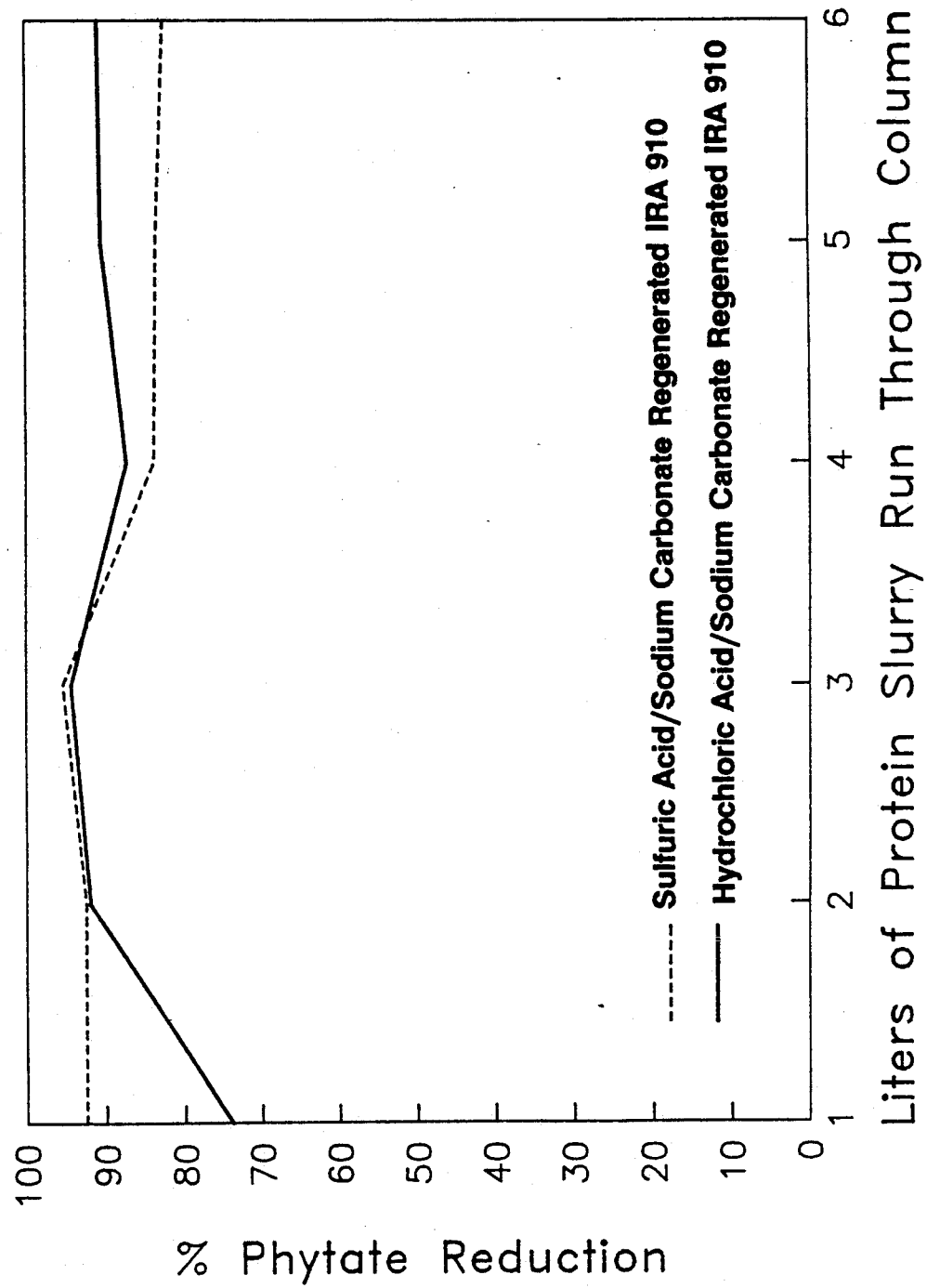

Results of phytate and protein analysis showed good phytate removal and protein recovery for the sulfate form IRA910 are presented in FIGS. 18 and 19. This experiment demonstrated the applicability of other resins forms to the process of phytate removal from protein disclosed herein.

EXPERIMENT XIII

In this experiment, phytate removal from hydrolyzed soy protein was attempted using the scaled up ion exchange process described in Experiment VII. A 6% total solids slurry of hydrolyzed soy protein at 10 DH (degree of hydrolysis) in water was passed upflow at 270 ml/min. through the ion exchange column at a temperature of 60° C. The hydrolyzed slurry was pumped through a 60 mesh (250 micron) filter to remove larger insoluble particles prior to ion exchange treatment. Minimal pressure drop across the resin bed was observed throughout the experiment. A total of 65 liters of the slurry was collected and analyzed for phytate, total solids, protein, and minerals.

Phytate reduction greater than 90% was achieved through a total volume of 65 liters. Protein recovery was greater than 95% and mineral profiles were comparable to those of previous ion exchange experiments using intact soy protein isolate. The resin was regenerated with sodium hydroxide, hydrochloric acid, and sodium carbonate according to the procedure and regenerate levels described in Experiments VI and VII. It is evident from this experiment that phytate can also be removed from a hydrolyzed soy protein source by the described ion exchange process.

EXPERIMENT XIV

Soy flour obtained from Cargill, Inc., Cedar Rapids, Iowa 52406 U.S.A. at 10% solids and rice flour obtained from California Natural Products, P.O.Box 1219, Lathrop, Calif. 95330 U.S.A. were slurried and passed through the anion exchange column containing "IRA-910" using the procedure described in Experiment VI to determine applicability of the process of removing phytate to these commodities. Difficulties were encountered when passing soy flour through the ion exchange column. Even though the upflow mode was employed, the total insoluble solids in the slurry made column passage very difficult. With the rice flour slurry, similar roadblocks were evident.

EXPERIMENT XV

Figure 20:
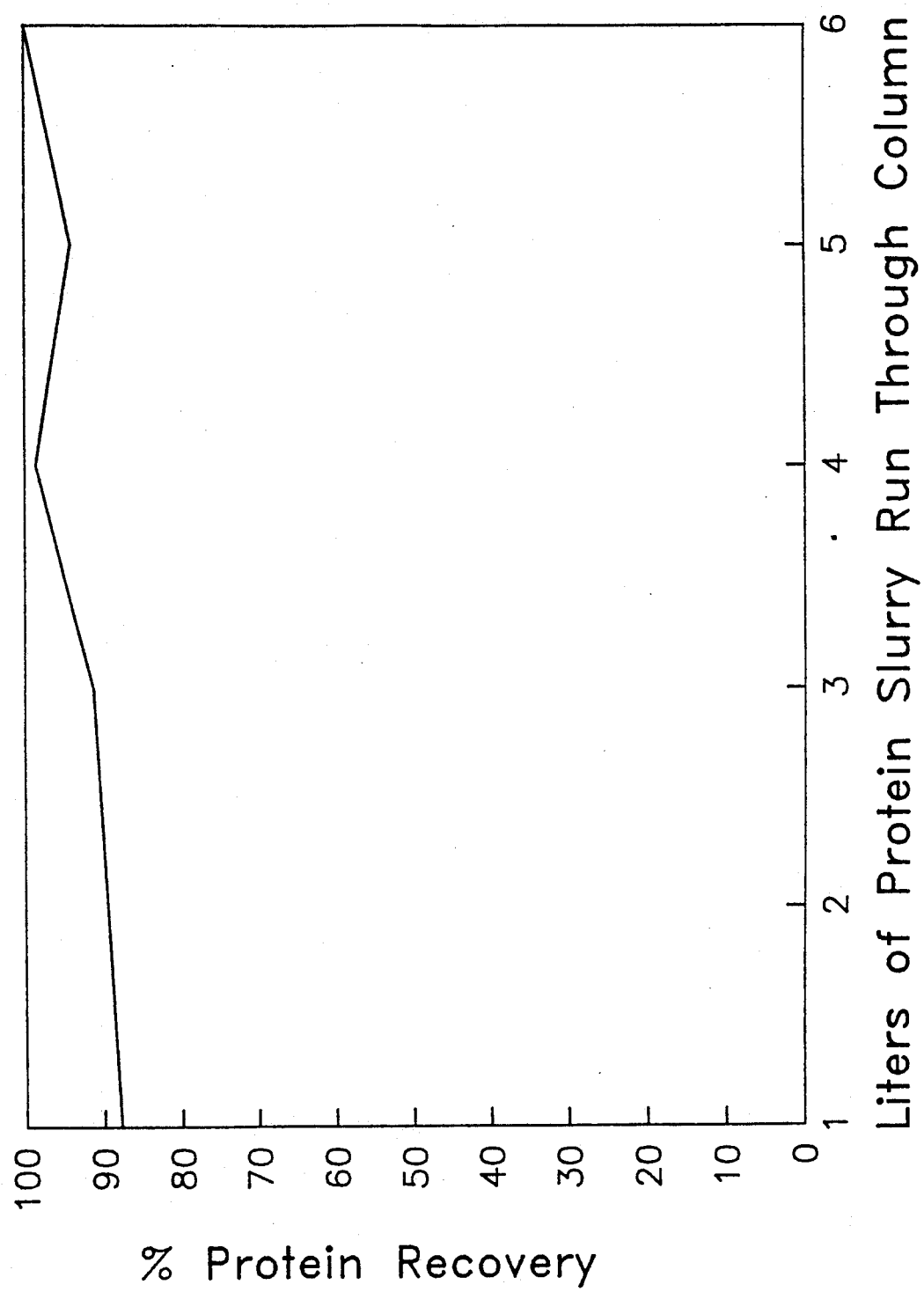
Figure 21:
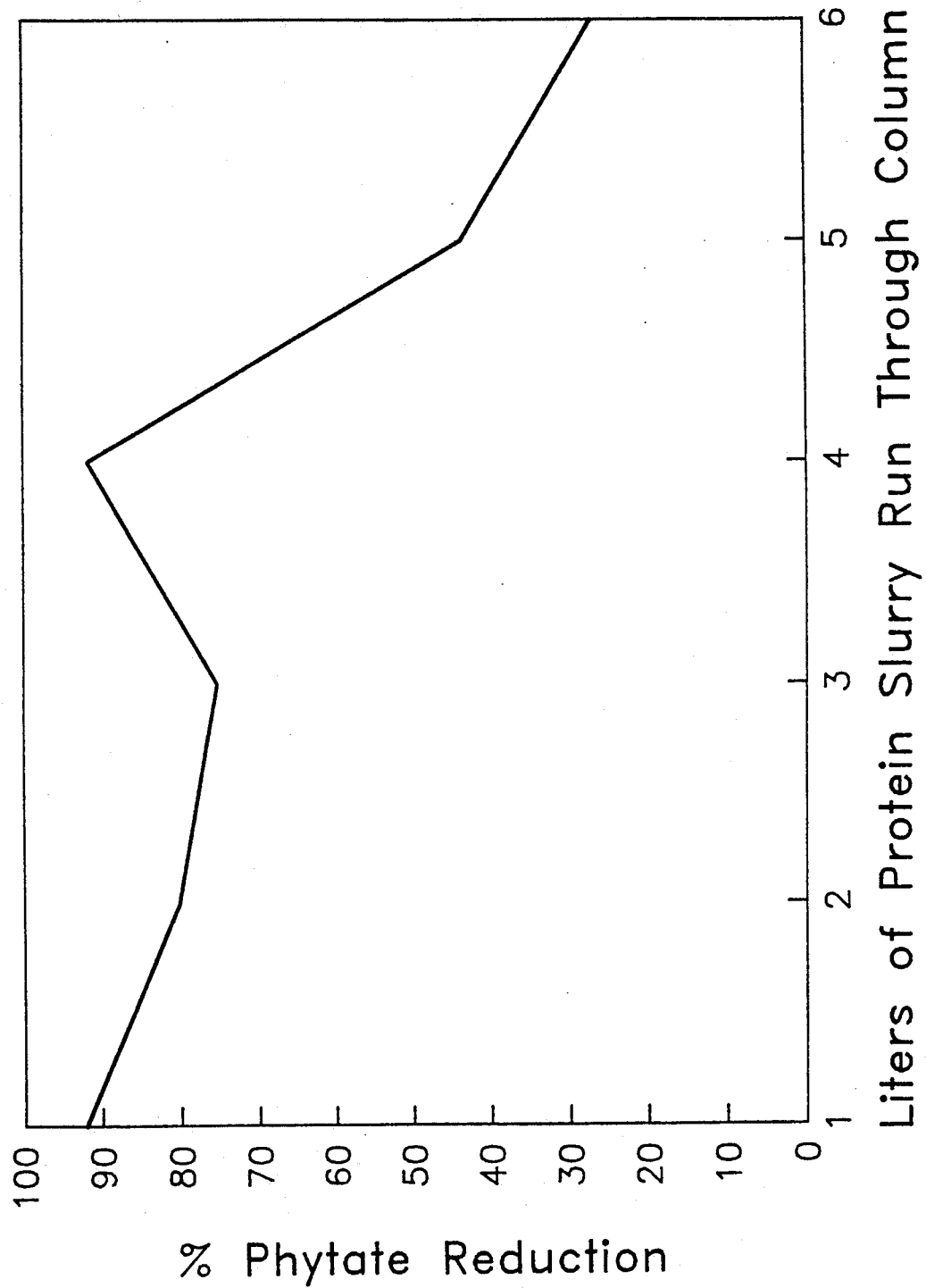

This experiment was designed to determine the efficacy of the ion exchange process using a weak base anion exchange resin form. The process had already been demonstrated with great success using strong base anion exchange resins. 310 ml (0.011 cubic feet) of Duolite A-7, a granular weak base anion exchange resin (Rohm & Haas) was loaded into the 2.54 cm diameter (one inch) column, rinsed with 850 ml of 6% sodium hydroxide, 2500 ml of 1% hydrochloric acid, and 830 ml of 1.5% sodium carbonate. Deionized water rinses were included between each conditioning step, and the column was finally rinsed with deionized water to a final conductivity of 133 /μmnhos. 6 liters of 5% SU-PRO ® 1610 soy protein were fed through the 140° C. column upflow at a rate of 20 ml/min and collected at 10 liter intervals. Samples were then analyzed for protein and phytate content. Protein recoveries and phytate removal using Duolite A-7 are shown in FIGS. 20 and 21. Pressure drop throughout the run remained at less than 34.5 kPa. It is evident from this data that although phytate is removed and protein recoveries are good, the strong base anion exchange resin is more effective for ion exchange removal of phytate from soy protein.

INDUSTRIAL APPLICABILITY

The ion exchange process disclosed herein is a very effective, viable method for the removal of phytate, sulfur containing compounds and phenolics from plant proteins with excellent protein recovery. The process has been demonstrated on a laboratory and pilot plant scale, with excellent results.

The phytate recovered from the regeneration process may be as valuable as the low phytate protein itself. The phytate may be converted, using phytase and/or phosphatase enzyme treatment, to myo-inositol, which is a commercially trade commodity.

A process for separating phytate from vegetable protein using ion exchange technology has not been demonstrated on a commercial scale prior to this time, mostly because of the unique combination of parameters which have been identified which are required to effectively operate the process. These are:

(a) Complete solubilization of the soy protein slurry entering the column is required in order to efficiently remove phytate. Incomplete solubilization of the protein in the slurry causes higher pressure drop across the ion exchange column due to "solids loading" which could result in a clogged column and lower phytate less efficient phytate removal.

(b) It is preferred that a type II macroporous strong base anion exchange resin be utilized for this process, although as demonstrated in Experiment XV a weak base resin may be used. It is equally as important that the anion exchanger be converted to a chloride or sulfate form, preferably in combination, with a portion of the anion exchanger converted to a carbonate form. The hydroxide form would take the pH of the feed slurry above 10, which is highly undesirable because of lysinoalanine formation. At all costs, passage through the isoelectric point of the protein (4.8–5.2) must be avoided to prevent protein precipitation in the column.

(c) Passage of the feed slurry through the column in an upflow mode is the most effective direction of flow in the operation of this process. Operation in the downflow mode met with minimal success because pressure increases are substantially higher than in the upflow mode. The level of phytate removal is also significantly lower with downflow mode operation in comparison with upflow mode operation.

(d) The regeneration process for the anion exchange resin is critical Sodium hydroxide strips the majority of the phytate from the resin beads, however, hydrochloric acid also removes some residual phytate. These acidic and basic conditions are very conducive to good sanitation, however, the hydrochloric acid leaves some weak base anion exchange sites (present in the strong base anion exchange resin) with HCl attachment (as opposed to the Cl conversion). This results in the pH of the feed slurry being lowered to its isoelectric point, with protein precipitation causing a plugged column. This obstacle is overcome with a final rinse of sodium carbonate. This solution converts the weak base sites, to free base form (FB) hence, no pH effect and no protein precipitation occurs in the column. It should be noted that the weak base anion sites could also be neutralized with other weak base salts such as sodium bicarbonate or ammonium hydroxide. The choice of sodium carbonate for these experiments was based on ease and safety of use, availability, and economics. (For new resins the resin manufacturer's instructions for conversion to "food grade" resins should be complied with also.)

(e) Heat apparently enhances phytate removal in the anion exchange process. While phytate removal is seen at ambient temperature (55% reduction), the process at 60° C. is significantly more effective (>95%). While the experiments described herein were conducted using strong base anion exchange resins, Type II, macroporous, because these materials are more appropriate for use with food products, it is recognized that the chemistry of strong base anion exchange resins, Type 1, macroporous and gels, and strong base anion exchange resins, Type II, gel, make these ion exchange materials suitable for use in practicing the present invention. While certain representative embodiments and details have been presented for the purpose of illustrating the invention, it will be apparent to those skilled in the art that various changes and modifications may be made therein without departing from the spirit or scope of the invention.

We claim:

1. A method of separating phytate from plant protein comprising the
    (a) providing at least one type II macroporous anion exchange resin selected from the group consisting of weak base and strong base anion exchange resins, said anion exchange resin having been conditioned by
        (i) exposing the resin to an agent which strips the surface of the resin of residue and converts the resin to a hydroxide form,
        (ii) thereafter exposing the resin to an agent which converts the resin to either a chloride form or a sulfate form, and
        (iii) thereafter exposing the resins to an agent which converts at least some of the strong base sites to the carbonate form and converts the weak base sites to the free base form;
    (b) providing an aqueous slurry containing a source of plant protein and phytate;
    (c) bringing the slurry into contact with the anion exchange resin; and
    (d) separating the slurry from the anion exchange resin.

2. A method of separating phytate from plant protein according to claim I wherein step (c) comprises placing the anion exchange resin in the slurry.

3. A method of separating phytate from plant protein according to claim 1 wherein steps (c) and (d) comprise passing the slurry through a structure which contains the anion exchange resin and has at least one inlet and one outlet.

4. A method of separating phytate from plant protein according to claim 3 wherein the structure is a vertical column.

5. A method of separating phytate from plant protein according to claim 4 wherein the slurry enters the vertical column via said inlet and exits the column via said outlet, with the inlet being located lower than the outlet.

6. A method of separating phytate from plant protein comprising the steps of:
   (a) providing a type II macroporous strong base anion exchange resin which has been conditioned by
      (i) exposing the resin to an agent which strips the surface of the resin of residue and converts the resin to a hydroxide form,
      (ii) thereafter exposing the resin to an agent which converts the resin to either a chloride form or a sulfate form, and
      (iii) thereafter exposing the resins to an agent which converts at least some of the strong base sites to the carbonate form and converts the weak base sites to the free base form;
   (b) providing an aqueous slurry containing a source of plant protein and phytate;
   (c) bringing the slurry into contact with the anion exchange resin; and
   (d) separating the slurry from the anion exchange resin.

7. A method of separating phytate from plant protein according to claim 6 wherein steps (c) comprises placing the anion exchange resin in the slurry.

8. A method of separating phytate from plant protein according to claim 6 wherein steps (c) and (d) comprise passing the slurry through a structure which contains the anion exchange resin and has at least one inlet and one outlet.

9. A method of separating phytate from plant protein according to claim 8 wherein the structure is a vertical column.

10. A method of separating phytate from plant protein according to claim 9 wherein the slurry enters the vertical column via said inlet and exits the column via said outlet, with the inlet being located lower than the outlet.

11. A method of separating phytate from plant protein according to any one of claims 6 through 10 wherein the plant protein is from soybeans.

12. A method of separating phytate from plant protein according to any one of claims 6 through 10 wherein the plant protein is partially hydrolyzed soybean protein.

13. A method of separating phytate from plant protein according to any one of claims 6 through 10 wherein the agent employed in step (a)(i) is sodium hydroxide.

14. A method of separating phytate from plant protein according to any one of claims 6 through 10 wherein the agent employed in step (a)(ii) is hydrochloric acid.

15. A method of separating phytate from plant protein according to any one of claims 6 through 10 wherein the agent employed in step (a)(iii) is selected from the group consisting of weak base salts.

16. A method of separating phytate from plant protein according to any one of claims 6 through 10 wherein the agent employed in step (a)(iii) is selected from the group consisting of sodium carbonate, sodium bicarbonate and ammonium hydroxide.

17. A method of separating phytate from plant protein according to any one of claims 6 through 10 wherein the agent employed in step (a)(iii) is sodium carbonate.

18. A method of separating phytate from plant protein according to any one of claims 6 through 10 wherein the agent employed in step (a)(ii) is sodium hydroxide. The agent employed in step (a)(ii) is hydrochloric acid. The agent employed in step (a)(iii) is sodium carbonate.

19. A method of separating phytate from plant protein according to any one of claims 6 through 10 further comprising the steps of:
   (e) after the completion of step (d) reconditioning the anion exchange resin by
      (i) exposing the resin to an agent which strips the surface of the resin of residue and converts the resin to a hydroxide form,
      (ii) thereafter exposing the resin to an agent which converts the resin to either a chloride form or a sulfate form, and
      (iii) thereafter exposing the resins to an agent which convrts at least some of the strong base sites to the carbonate form and converts the weak base sites to the free base form;
   (f) providing more of the aqueous slurry;
   (g) bringing the slurry into contact with the reconditioned resin; and
   (h) separating the slurry from the resin 20. A method of separating phytate from soy protein comprising the steps of:
   (a) providing a vertical column which has an inlet and an outlet, the inlet being located lower than the outlet, said column containing a type II macroporous strong base anion exchange resin;
   (b) conditioning said anion exchange resin by
      (i) rinsing the resin with sodium hydroxide,
      (ii) thereafter rinsing the resin with hydrochloric acid, and
      (iii) thereafter rinsing the resin with an agent selected from the group consisting of weak base salts;
   (c) providing an aqueous slurry containing soy protein and phytate; and
   (d) passing the slurry through the inlet to enter the column, then through the anion exchange resin, then through the outlet to exit the column.

21. A method of separating phytate from soy protein comprising the steps of:
   (a) providing a vertical column which has an inlet and an outlet, the inlet being located lower than the outlet, said column containing a type II macroporous strong base anion exchange resin;
   (b) conditioning said anion exchange resin by
      (i) rinsing the resin with sodium hydroxide,
      (ii) thereafter rinsing the resin with hydrochloric acid, and
      (iii) thereafter rinsing the resin with an agent selected from the group consisting of sodium carbonate, sodium bicarbonate and ammonium hydroxide;
   (c) providing an aqueous slurry containing soy protein and phytate; and
   (d) passing the slurry through the inlet to enter the column, then through the anion exchange resin, then through the outlet to exit the column.

22. A method of separating phytate from soy protein comprising the
   (a) providing a vertical column which has an inlet and an outlet, the inlet being located lower than the outlet, said column containing a type II macroporous strong base anion exchange resin;
   (b) conditioning said anion exchange resin by
      (i) rinsing the resin with sodium hydroxide,
      (ii) thereafter rinsing the resin with hydrochloric acid, and
      (iii) thereafter rinsing the resin with sodium carbonate;
   (c) providing an aqueous slurry containing soy protein and phytate; and
   (d) passing the slurry through the inlet to enter the column, then through the anion exchange resin, then through the outlet to exit the column.

23. A method of separating phytate from soy protein according to any one of claims 20, 21 or 22 wherein the soy protein provided in the slurry in step (c) has been partially hydrolyzed.

24. A method of separating phytate from soy protein according to any of claims 20, 21 or 22 further comprising the step of:
   (e) after the completion of step (d) reconditioning the anion exchange resin by
      (i) rinsing the resin with sodium hydroxide,
      (ii) thereafter rinsing the resin with hydrochloric acid, and
      (iii) thereafter rinsing the resin with an agent selected from the group consisting of weak base salts.

25. A method of separating phytate from soy protein according to any of claims 20, 21 or 22 further comprising the step of:
   (e) after the completion of step (d) reconditioning the anion exchange resin by
      (i) rinsing the resin with sodium hydroxide,
      (ii) thereafter rinsing the resin with hydrochloric acid, and
      (iii) thereafter rinsing the resin with an agent selected from the group consisting of sodium carbonate, sodium bicarbonate and ammonium hydroxide.

26. A method of separating phytate from soy protein according to any of claims 21, 22 or 23 further comprising the step of:
   (e) after the completion of step (d) reconditioning the anion exchange resin by
      (i) rinsing the resin with sodium hydroxide,
      (ii) thereafter rinsing the resin with hydrochloric acid, and
      (iii) thereafter rinsing the resin with sodium carbonate.

27. A method of separating phytate from plant protein comprising the
   (a) providing at least one ion exchange material selected from the group consisting of strong base anion exchange resins, Types I and II, macroporous and gels, said ion exchange material having been conditioned by
      (i) exposing the resin to an agent which strips the surface of the resin of residue and converts the resin to a hydroxide form,
      (ii) thereafter exposing the resin to an agent which converts the resin to either a chloride form or a sulfate form, and
      (iii) thereafter exposing the resin to an agent which converts at least some of the strong base sites to the carbonate form and converts the weak base sites to the free base form;
   (b) providing an aqueous slurry containing a source of plant protein and phytate;
   (c) bringing the slurry into contact with the anion exchange resin; and
   (d) separating the slurry from the anion exchange resin.

28. A method of separating phytate from plant protein according to claim 27 wherein step (c) comprises placing the anion exchange resin in the slurry.

29. A method of separating phytate from plant protein according to claim 27 wherein steps (c) and (d) comprise passing the slurry through a structure which contains the anion exchange resin and has at least one inlet and one outlet.

30. A method of separating phytate from plant protein according to claim 29 wherein the structure is a vertical column.

31. A method of separating phytate from plant protein according to claim 30 wherein the slurry enters the vertical column via said inlet and exits the column via said outlet, with the inlet being located lower than the outlet.

* * * * *

UNITED STATES PATENT AND TRADEMARK OFFICE
CERTIFICATE OF CORRECTION

PATENT NO. : 5,248,804

DATED : September 28, 1993

INVENTOR(S) : C. Nardelli, T. Mazer, A. Hogarth, J. Suh, A. Daab-Krzykowski, L. Pickett, H. Keller, W. Nelson It is certified that error appears in the above-indentified patent and that said Letters Patent is hereby corrected as shown below:

Column 2, line 21, "Bolley et al" should be --Bolley et al.--.

Column 6, line 22, "wi th" should be --with--.

Column 22, lines 11-12, delete the last two sentences "The agent employed in step (a)(ii) is hydrochloric acid. The agent employed in step (a)(iii) is sodium carbonate.".

Column 22, line 31, after "resin" insert a period (.).

Column 23, line 2, "the" should be followed by --steps of:--.

Column 24, line 9, "the' should be followed by --steps of:--.

Signed and Sealed this

Twenty-sixth Day of April, 1994

Attest:

BRUCE LEHMAN

*Attesting Officer*     *Commissioner of Patents and Trademarks*